United States Patent
Yada et al.

(10) Patent No.: US 6,464,175 B2
(45) Date of Patent: Oct. 15, 2002

(54) ROTOR BLADE OPERATING DEVICE IN AIRPLANE AND FLAPERON OPERATING DEVICE IN AIRPLANE

(75) Inventors: Wataru Yada; Hiroshi Yamanouchi; Minoru Uchida; Katsutoshi Tada, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/903,872

(22) Filed: Jul. 13, 2001

(65) Prior Publication Data

US 2002/0020781 A1 Feb. 21, 2002

(30) Foreign Application Priority Data

Jul. 14, 2000 (JP) ........................................ 2000-218702
Oct. 23, 2000 (JP) ........................................ 2000-328410

(51) Int. Cl.[7] .............................................. B64C 13/04
(52) U.S. Cl. ...................... 244/213; 244/75 R; 244/225
(58) Field of Search ................................ 244/213–216, 244/75 R, 225, 90 R

(56) References Cited

U.S. PATENT DOCUMENTS

| 3,659,810 A | * | 2/1972 | Robertson | 244/225 |
| 3,655,149 A | * | 4/1972 | Williams | 244/216 |
| 4,180,222 A | * | 12/1979 | Thornburg | 244/75 R |
| 5,493,497 A | * | 2/1996 | Buus | 244/195 |
| 5,702,072 A | * | 12/1997 | Nusbaum | 244/225 |

FOREIGN PATENT DOCUMENTS

| JP | 49-124800 | 11/1974 |
| JP | 53-33360 | 8/1978 |
| JP | 60-47156 | 10/1985 |

* cited by examiner

*Primary Examiner*—Galen L. Barefoot
(74) *Attorney, Agent, or Firm*—Arent Fox Kintner Plotkin & Kahn, PLLC

(57) ABSTRACT

A flaperon operating device having a center pulley and a slider supported on a center shaft. When the center pulley and the slider are rotated about the center shaft, left and right driving pulleys are rotated in the same direction, whereby left and right flaperons are operated in opposite directions to provide aileron functions. When the slider is slid rearwards on the center shaft by an actuator, the left and right driving pulleys are rotated in opposite directions, whereby both the left and right flaperons are lowered to provide flap functions. If the left and right flaperons are lifted or lowered by a very small angle in the same phase by the actuator, boundary layers on main wings can be controlled to reduce the drag.

5 Claims, 23 Drawing Sheets

ROTOR BLADE OPERATING DEVICE IN AIRPLANE AND FLAPERON OPERATING DEVICE IN AIRPLANE

BACKGROUND OF THE INVENTION

1. Field of the Invention

The present invention relates to a rotor blade (e.g., flaperon) operating device in an airplane for vertically moving left and right rotor blades (flaperons) which are movably mounted on the trailing edges of left and right main wings, in reverse phases and in the same phase.

2. Description of the Related Art

Such rotor blade (flaperon) operating devices in the airplanes are known from Japanese Patent Publication No. 60-47156, Japanese Utility Model Publication No. 53-33360 and Japanese Patent Application Laid-open No. 49-124800.

The above known rotor blade (flaperon) operating devices in airplanes suffer a problem that an aileron-operating input and a flap-operating input are transmitted to rotor blades through a complicated mixing mechanism comprising a large number of links and levers, resulting in an increase in the number of parts and a complicated structure, and causing an increase in cost, an increase in weight and the occurrence of trouble. Also the entire device is increased in size, whereby it is difficult to ensure space for mounting the device on an airframe. The rotor blades only have an aileron function and a flap function and do not have a drag reducing function.

SUMMARY OF THE INVENTION

Accordingly, it is an object of the present invention to provide a rotor blade (flaperon) operating device in an airplane, which is of a simple, small-sized and lightweight structure, which is easy to mount on an airframe, and which has a drag reducing function in addition to an aileron function, an elevator function and a flap function.

To achieve the above object, according to a first aspect and feature of the present invention, there is proposed a rotor blade operating device in an airplane including rotor blades vertically movably mounted on the trailing edge of left and right main wings, respectively, so that the left and right rotor blades are moved vertically in reverse phases to control a rolling moment; moved vertically in the same phase to control lifting power or pitching moment, and moved vertically in the same phase by a very small steering angle to control drag. The rotor blade operating device comprises a rotor mounted for clockwise and counterclockwise rotation about a rotor shaft extending in the longitudinal direction of an airframe, a slider mounted for clockwise and counterclockwise rotation in unison with the rotor and for longitudinal movement along the rotor shaft. A first left link is pivotally supported at one end thereof on the rotor shaft, a first right link is pivotally supported at one end thereof on the rotor shaft, a second left link is pivotally supported at one end thereof on the slider and at the other end thereof at an intermediate portion or the other end of the first left link, a second right link is pivotally supported at one end thereof on the slider and at the other end thereof at an intermediate portion or the other end of the first right link, a third left link is pivotally supported at a laterally inner end thereof at the other end of the first left link and coupled at a laterally outer end thereof to the left rotor blade through a connecting mechanism, and a third right link pivotally supported at a laterally inner end thereof at the other end of the first right link and coupled at a laterally outer end thereof to the right rotor blade through a connecting mechanism. Thus the left and right rotor blades are vertically moved in reverse phases by rotating the rotor and the slider clockwise or counterclockwise about the rotor shaft and moving the third left and right links laterally in the same direction through the second left and right links and the first left and right links, and the left and right rotor blades are vertically moved in the same phase by moving the slider longitudinally along the rotor shaft and moving the first left and right links and the third left and right links laterally in the opposite directions through the second left and right links.

With the above arrangement, the third left and right links can be moved laterally in the same direction through the second left and right links and the first left and right links by rotating the rotor and the slider clockwise or counterclockwise about the rotor shaft, whereby the left and right rotor blades can be vertically moved in the reverse phases to function as ailerons, and the first left and right links and the third left and right links can be moved laterally in the opposite directions through the second left and right links by moving the slider longitudinally along the rotor shaft, whereby the left and right rotor blades can be vertically moved in the same phase to function as flaps or elevators. Further, the drag can be reduced by vertically moving the left and right rotor blades in the same phase by a very small angle to control boundary layers on the main wings. Thus, it is possible to allow the rotor blades to provide the flap functions to provide an increase in maximum lifting power, or it is possible to allow the rotor blades to provide the elevator functions to control the pitching, and at the same time, it is possible to provide the aileron functions to carry out the control of rolling without hindrance. Further, the drag on the main wings can be reduced during cruising of the airplane to reduce the amount of fuel consumed. Moreover, the first left and right links and the second left and right links are pivotally supported at one-ends thereof on the rotor and the slider which are supported on the common rotor shaft, respectively, the second left and right links are pivotally supported at the other ends thereof at the intermediate portions or the other ends of the first left and right links, and the left and right rotor blades are operated by the third left and right links pivotally supported at the other ends of the first left and right links. Therefore, the rotor blade operating device can be made in an extremely simple structure and at a low cost, a small size and a light weight, and is easy to mount on the airframe.

According to a second aspect and feature of the present invention, the rotor blade operating device further includes an actuator for operating the slider longitudinally along the rotor shaft, and a control means for calculating a steering angle for the left and right rotor blades in order to minimize the drag on the main wings and for controlling the operation of the actuator based on the calculated steering angle.

With the above arrangement, the control means calculates the steering angle for the left and right rotor blades in order to minimize the drag on the main wings and operates the actuator based on the calculated steering angle, thereby controlling the steering angles for the left and right rotor blades. Therefore, the drag on the main wings can be effectively reduced.

In the first and second features, flaperons FEL and FER in an embodiment correspond to rotor blades in the present invention; a center shaft in the embodiment corresponds to the rotor shaft in the present invention; a center pulley in the embodiment corresponds to the rotor in the present invention; and a control unit in the embodiment corresponds to the control means in the present invention.

To achieve the above object, according to a third aspect and feature of the present invention, there is proposed a flaperon operating device in an airplane including left and right flaperons vertically movably mounted respectively on the trailing edges of the left and right main wings, wherein they are moved vertically in reverse phases to function as ailerons, and they are moved vertically in the same phase to functions as flaps. The flaperon operating device comprises a rotor mounted for clockwise and counterclockwise rotation about a rotor shaft extending in a longitudinal direction of an airframe, and a slider mounted for clockwise and counterclockwise rotation in unison with the rotor and for longitudinal movement along the rotor shaft. A first left link is pivotally supported at one end thereof on the rotor shaft, a first right link is pivotally supported at one end thereof on the rotor shaft, a second left link is pivotally supported at one end thereof on the slider and at the other end thereof at the other end of the first left link, a second right link is pivotally supported at one end thereof on the slider and at the other end thereof at the other end of the first right link, a third left link is pivotally supported at a laterally inner end thereof at the other end of the first left link and connected at a laterally outer end thereof to the left flaperon through a connecting mechanism, and a third right link is pivotally supported at a laterally inner end thereof at the other end of the first right link and connected at a laterally outer end thereof to the right flaperon through a connecting mechanism. Thus, the left and right flaperons are caused to function as ailerons in such a manner that they are vertically moved in reverse phases by rotating the rotor and the slider clockwise or counterclockwise about the rotor shaft and moving the third left and right links laterally in the same direction through the second left and right links and the first left and right links, and the left and right flaperons are caused to function as flaps in such a manner that they are vertically moved in the same phase by moving the slider longitudinally along the rotor shaft and moving the first left and right links and the third left and right links laterally in the opposite directions through the second left and right links.

With the above arrangement, the third left and right links can be moved laterally in the same direction through the second left and right links and the first left and right links by rotating the rotor and the slider clockwise or counterclockwise about the rotor shaft, whereby the left and right flaperons can be vertically moved in the reverse phases to function as ailerons, and the first left and right links and the third left and right links can be moved laterally in the opposite directions through the second left and right links by moving the slider longitudinally along the rotor shaft, whereby the left and right flaperons can be vertically moved in the same phase to function as flaps. Thus, it is possible to allow the flaperons to provide the flap functions in the taking-off or landing of the airplane, to thereby provide an increase in maximum lifting power, and at the same time, it is possible to allow the flaperons to provide the aileron functions to carry out the control of rolling without hindrance. Moreover, the first left and right links and the second left and right links are pivotally supported at one-ends thereof on the rotor and the slider which are supported on the common rotor shaft, respectively, so that the left and right flaperons are operated by the third left and right links pivotally supported at the other ends of the first and second left and right links. Therefore, the flaperon-operating device can be made in an extremely simple structure and at a low cost, a small size and a light weight, and is easy to mount on the airframe.

According to a fourth aspect and feature of the present invention, each of the coupling mechanisms includes a driving pulley connected to the laterally outer end of the third link for rotation, a driven pulley linked to the driving pulley through a control cable, and a flaperon link adapted to convert the rotation of the driven pulley into the vertical movement of the flaperon.

With the above arrangement, the third link and the flaperon are connected to each other through the coupling mechanism comprising the driving pulley, the control cable, the driven pulley and the flaperon link and hence, the left and right flaperons at locations laterally spaced apart from the third links can be driven by a simple and lightweight structure.

According to a fifth aspect and feature of the present invention, the aileron-steering angle at the time when the flaperon is in a flap-lowered state is set at a value smaller than the aileron-steering angle at the time when the flaperon is in a flap-lifted state.

With the above arrangement, the aileron-steering angle at the time when the flaperon is in a flap-lowered state is made smaller and hence, it is possible to prevent a total lowering angle of a flap-lowering angle and a aileron-lowering angle from being excessive, thereby alleviating the steering force and avoiding the generation of a stalling of a wing tip.

In the above third to fifth features, a center shaft in the embodiment corresponds to a rotor shaft in the present invention, and a center pulley in the embodiment corresponds to a rotor in the present invention.

The above and other objects, features and advantages of the invention will become apparent from the following description of the preferred embodiment taken in conjunction with the accompanying drawings.

BRIEF DESCRIPTION OF THE DRAWINGS

FIGS. 1 to 23 show an embodiment of the present invention, wherein

FIG. 1 is a plan view of main wings of an airplane;

FIG. 2 is a plan view of an essential portion of FIG. 1;

FIG. 3 is a perspective view of a flaperon-operating device;

FIG. 4 is an enlarged view of an essential portion of FIG. 3;

FIG. 5 is a view taken in a direction of an arrow 5 in FIG. 3;

FIG. 6 is an enlarged view taken along a line 6—6 in FIG. 5;

FIG. 7 is an enlarged view taken along a line 7—7 in FIG. 5;

FIG. 8 is an enlarged view taken in a direction 8 in FIG. 3;

FIG. 9 is a view taken along a line 9—9 in FIG. 8;

FIG. 10 is a view for explaining the operation when flaperons are operated leftwards;

FIG. 11 is a view for explaining the operation when the flaperons are lowered;

FIG. 12 is a view for explaining the operation when the flaperons are operated leftwards from lowered states;

FIG. 13 is a view for explaining the operation when the flaperons are lifted through a very small steering angle;

FIG. 15 is a diagram showing a profile of the main wing of the airplane;

FIG. 16 is a block diagram for a drag-reducing control of the airplane;

FIG. 17 is a diagram showing the relationship among the lifting power L, the drag D, the thrust T and the angle of incidence α in the vertical movement of the airplane;

FIG. 18 is a diagram showing XYZ coordinate axes and variables representing the motional state of the airplane;

FIG. 19 is a graph showing a characteristic of the variation in drag coefficient relative to an angle of incidence when the steering angle of the flaperon has been varied to various values;

FIG. 20 is a block diagram for the control of the flying of the airplane;

FIG. 21 is a flow chart for the drag-reducing control;

FIG. 22 is a diagram showing the relationship between the steering angle of the flaperon and the drag.

DESCRIPTION OF THE PREFERRED EMBODIMENT

The present invention will now be described by way of an embodiment with reference to FIGS. 1 to 23.

Figure 1:
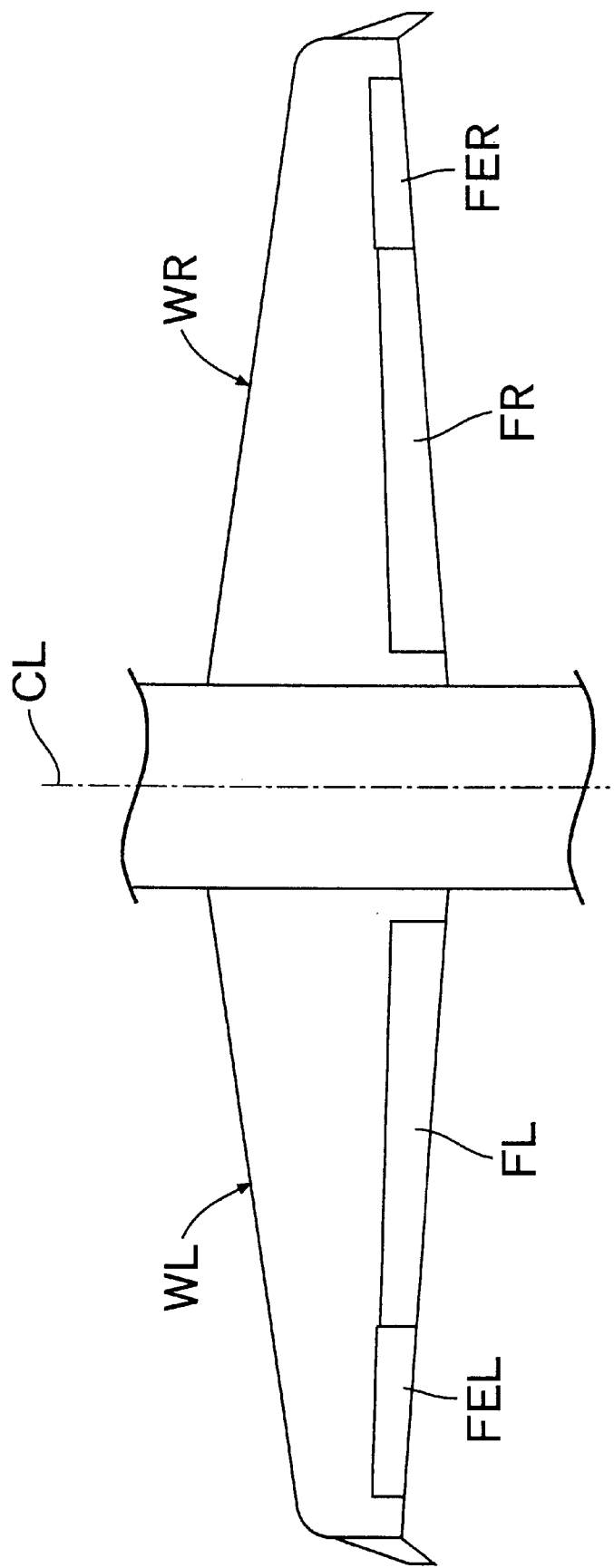

As shown in FIG. 1, main wings WL and WR of an airplane are provided at their trailing edges with left and right flaps FL and FR located at the wing roots, and left and right flaperons FEL and FER located at the wing tips. The flaps FL and FR are lowered while projecting rearwards from a housed position shown in FIG. 1 in order to increase the maximum lifting power in the taking-off or landing of the airplane. Each of the flaperons FEL and FER has an aileron function, a flap function and a drag reducing function. When the left flaperon FEL is lifted and the right flaperon is lowered during cruising of the airplane, a leftward rolling moment is generated, when the right flaperon is lifted and the left flaperon is lowered, a rightward rolling moment is generated. When the left and right flaperons FEL and FER are lowered in the same phase in the taking-off or landing of the airplane, they provide the flap function. When the left and right flaperons FEL and FER are moved upwards and downwards in the reverse phases relative to the lowered position, they provide the aileron function. Further, when the left and right flaperons FEL and FER are lifted or lowered through a very small steering angle in the same phase, the transition point of a boundary layer of each of the main wings WL and WR is changed to cause a drag reducing function.

The structure of a device for operating the flaperons FEL and FER will be described below with reference to FIGS. 2 to 9.

Figure 2:
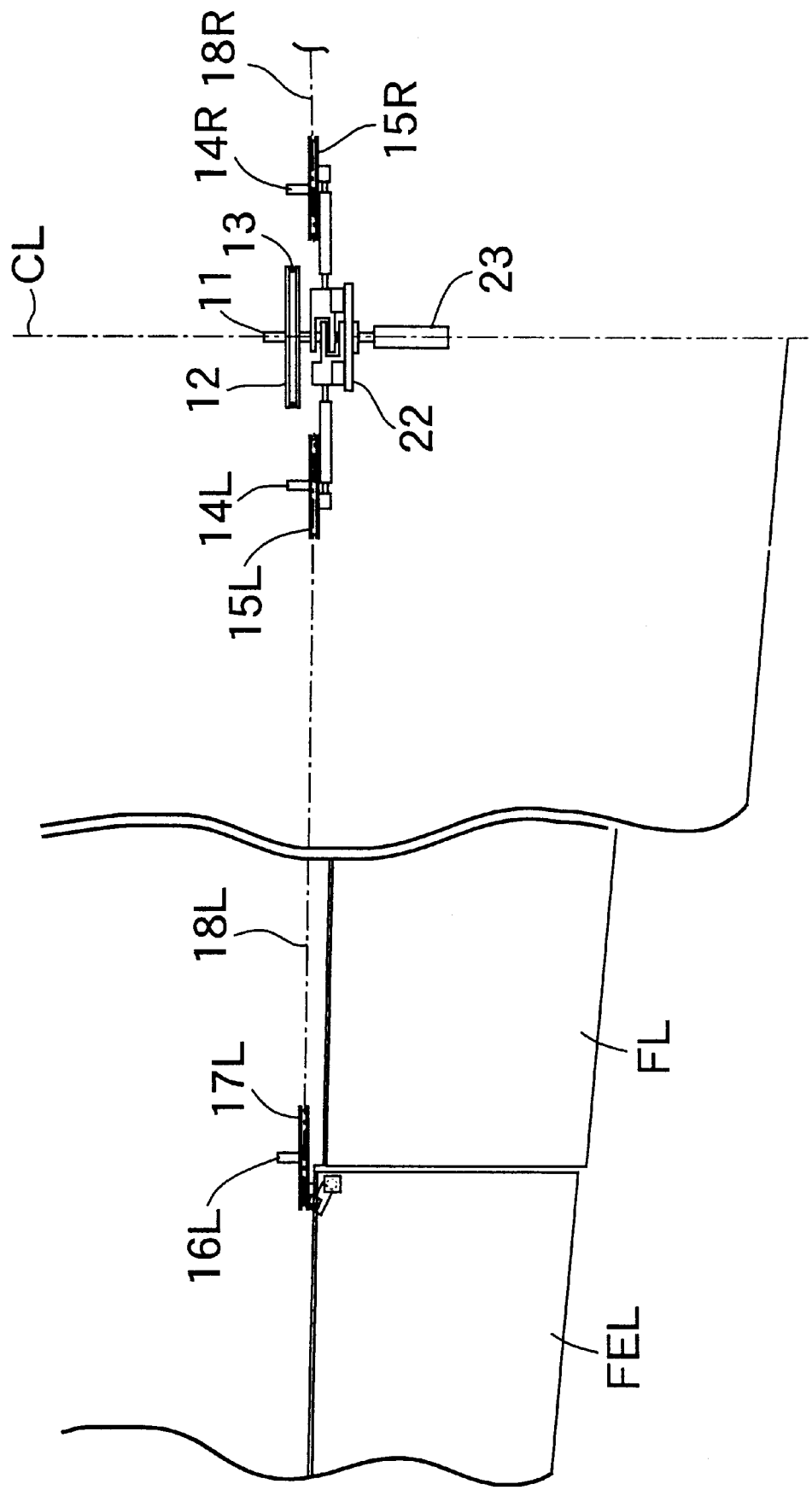
Figure 3:
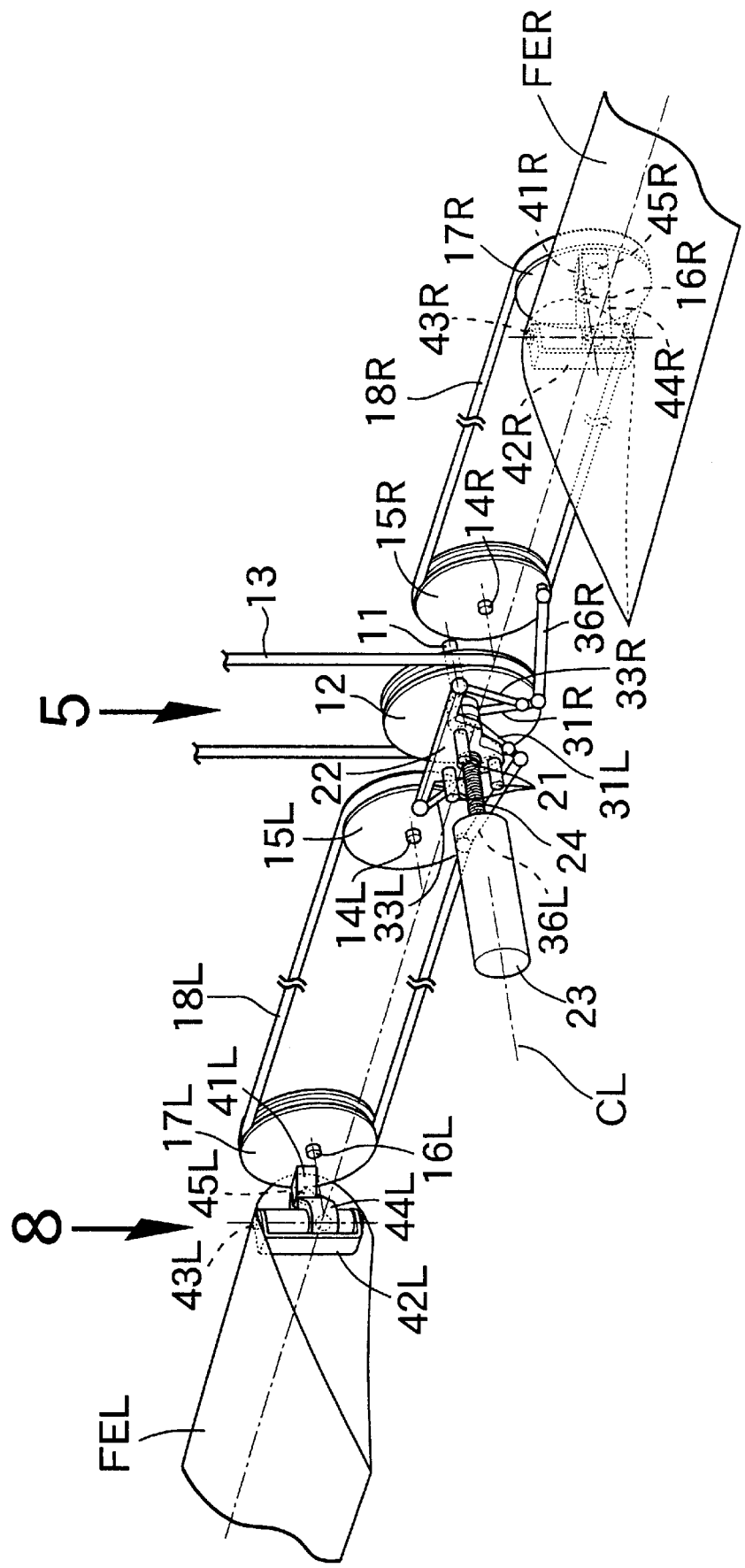

As shown in FIGS. 2 and 3, the device for operating the flaperons FEL and FER includes a center shaft 11 disposed in a longitudinal direction on a center line CL of an airframe in the vicinity of the trailing edges of the main wings WL and WR. A center pulley 12 is rotatably supported on the center shaft 11 and connected through a control cable 13 to a control wheel (not shown) operated by a pilot. Longitudinally extending pulley shafts 14L and 14R are mounted on laterally opposite sides of the center pulley 12, and a left driving pulley 15L and a right driving pulley 15R are rotatably supported on the pulley shafts 14L and 14R. Pulley shafts 16L and 16R are mounted in the vicinity of ends of the left and right flaperons FEL and FER adjacent the wing roots, and a left driven pulley 17L and a right driven pulley 17R are rotatably supported on the pulley shafts 16L and 16R. The left driving pulley 15L and the left driven pulley 17L are connected to each other by a control cable 18L extending along a leading edge of the left flap FL, and the right driving pulley 15R and the right driven pulley 17R are connected to each other by a control cable 18R extending along a leading edge of the right flap FR.

As can be seen from FIGS. 4 to 7, three guide rods 21 are embedded in the center pulley 12 to extend rearwards, and a slider 22 is longitudinally slidably carried on the guide rods 21. An actuator 23 comprising an electric motor is mounted to the rear of the center pulley 12. The actuator 23 has an output shaft 24 disposed coaxially with the center shaft 11, and an external threaded portion formed on an outer periphery of the output shaft 24 is threadedly engaged with a nut member 25 mounted on the slider 22. Therefore, when the actuator 23 is driven, the slider 22 is moved forwards and rearwards along with the nut member 25, while being guided along the guide rods 21. The actuator 23 is operated based on an electric signal output when the pilot operates a flap-operating lever (not shown).

Each of a first left bifurcated link 31L and a first right bifurcated link 31R is vertically pivotally supported at its one end on the center shaft 11 sandwiched between the center pulley 12 and the slider 22. As can be seen from FIG. 6, the first left link 31L extends leftwards and downwards from the center shaft 11, and the first right link 31R extends rightwards and downwards from the center shaft 11, as viewed from the rear. A second left bifurcated link 33L is pivotally supported at one end thereof at a left and upper portion of the slider by a ball joint 32L and pivotally supported at the other end thereof at an intermediate portion of the first left link 31L by a ball joint 34L. Likewise, a second right bifurcated link 33R is pivotally supported at one end thereof at a right and upper portion of the slider 22 by a ball joint and pivotally supported at the other end thereof at an intermediate portion of the first right link 31R by a ball joint 34R. Alternatively, the second left and right links 33L and 33R mat be pivotally supported at the other ends thereof at the other ends of the first left and right links 31L and 31R, in place of being pivotally supported at the other ends thereof at the intermediate portions of the first left and right links 31L and 31R. As viewed from the rear (see FIG. 6), the second left link 33L, over an area from one end toward the other end thereof, extends rightwards and downwards from the left and above, and the second right link 33R, over an area from one end toward the other end thereof, extends leftwards and downwards from the right and above. As viewed sideways (see FIG. 7), the second left and right links 33L and 33R, over an area from one end toward the other end thereof, extends forwards and downwards from the rear and above.

The first left link 31L is pivotally supported at the other end thereof at a right end of a third left link 36L through a pin 35L. The generally laterally extending third left link 36L is pivotally supported at its left end at a lower portion of the left driving pulley 15L through a pin 37L. The first right link 31R is pivotally supported at the other end thereof at a left end of a third right link 36R through a pin 35R. The generally laterally extending third right link 36R is pivotally supported at its left end at a lower portion of the right driving pulley 15R through a pin 37R.

Figure 8:
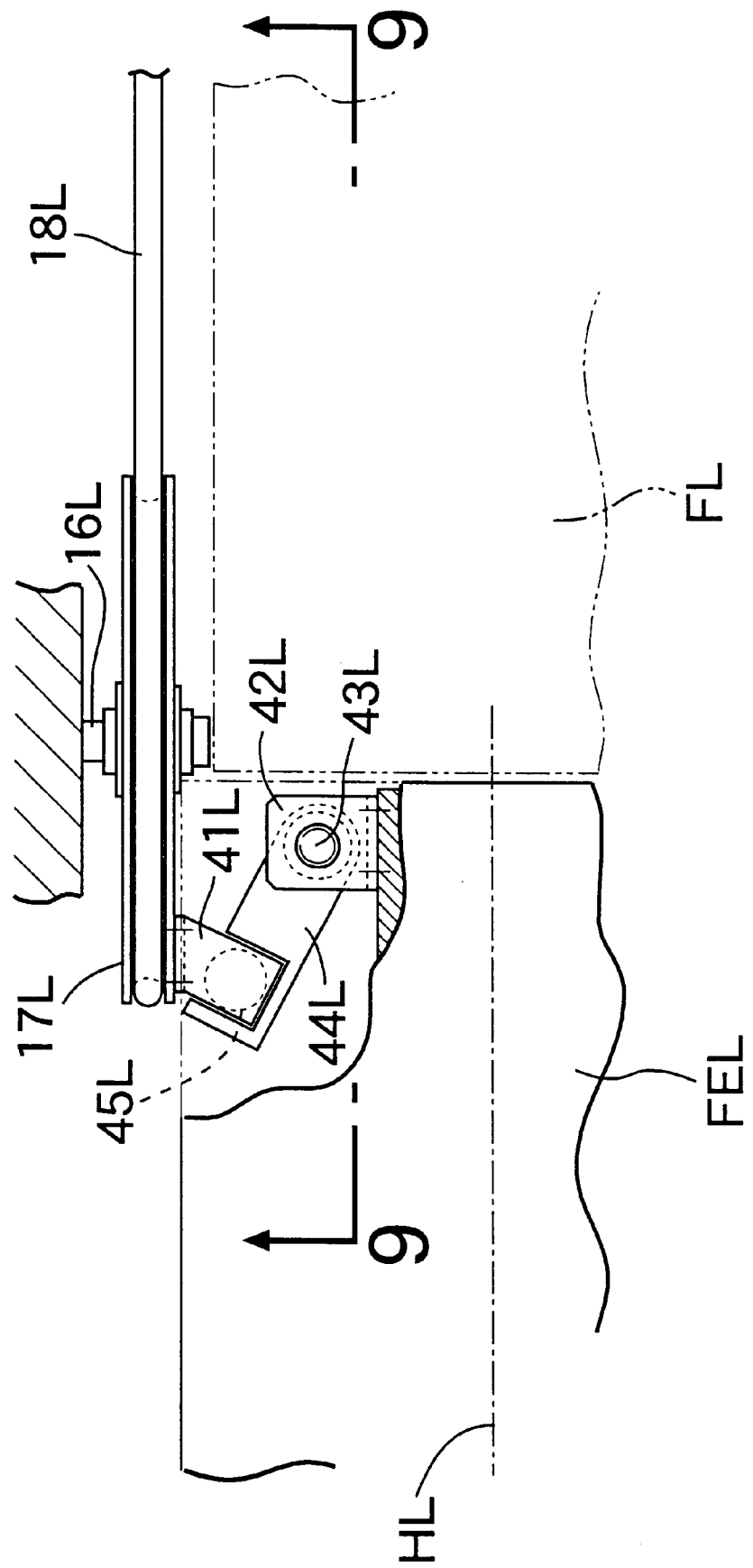
Figure 9:
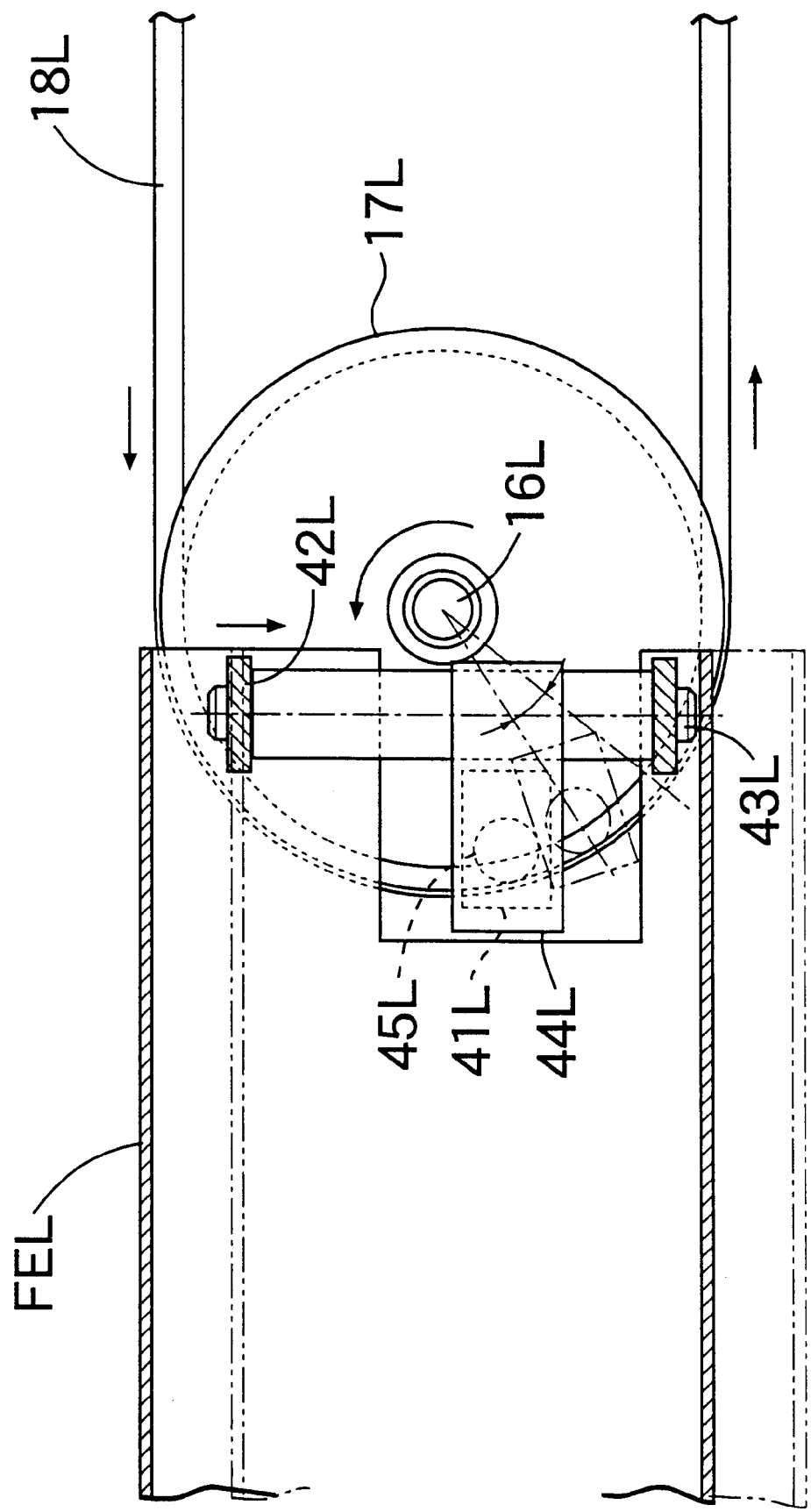

As can be seen from FIGS. 3, 8 and 9, an arm 41L is projectingly provided on a rear surface of a left end of the left driven pulley 17L. A angular U-shaped bracket 42L is provided on the left flaperon FEL at a location in front of a hinge line (see FIG. 8), and a flaperon link 44L is pivotally supported on the bracket 42L through a vertically extending pin 43L. The arm 41L of the left driven pulley 17L and the flaperon link 44L are pivotally supported at their tip ends by a ball joint 45L.

In this way, the third left link 36L and the left flaperon FEL are connected to each other through a coupling mechanism comprising the left driving pulley 15L, the control cable 18L, the left driven pulley 17L and the flaperon link 44L and hence, the left flaperon FEL lying at a location spaced laterally from the center line CL of the airframe can be driven reliably by a simple and lightweight structure.

A mechanism for coupling the third right link 36R and the right flaperon FER is of a structure identical to and laterally symmetric with the mechanism for coupling the third left link 36L and the left flaperon FEL, and hence, the duplicated description of the coupling mechanism is omitted.

The operation of the embodiment of the present invention having the above-described arrangement will be described below.

Figure 4:
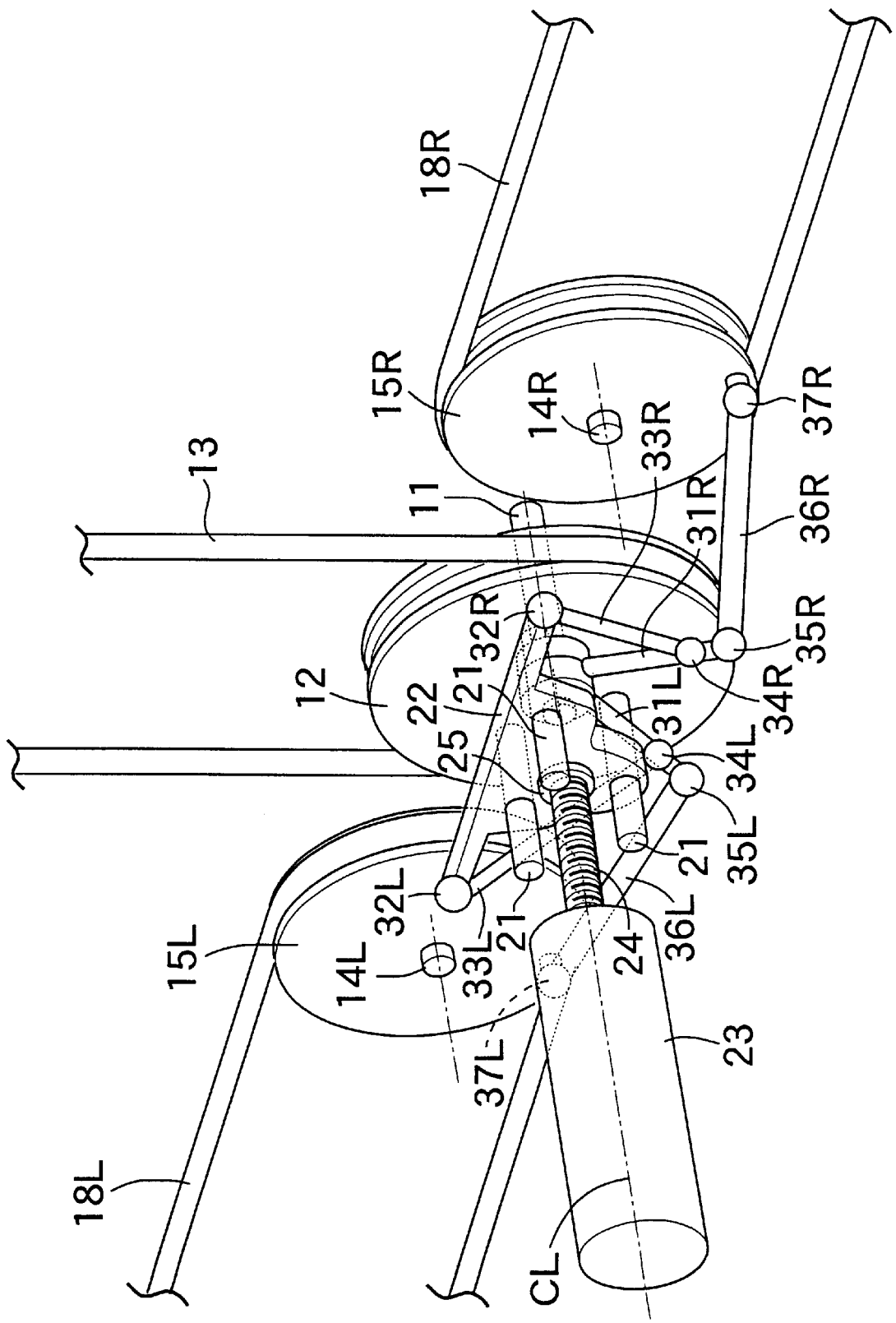
Figure 5:
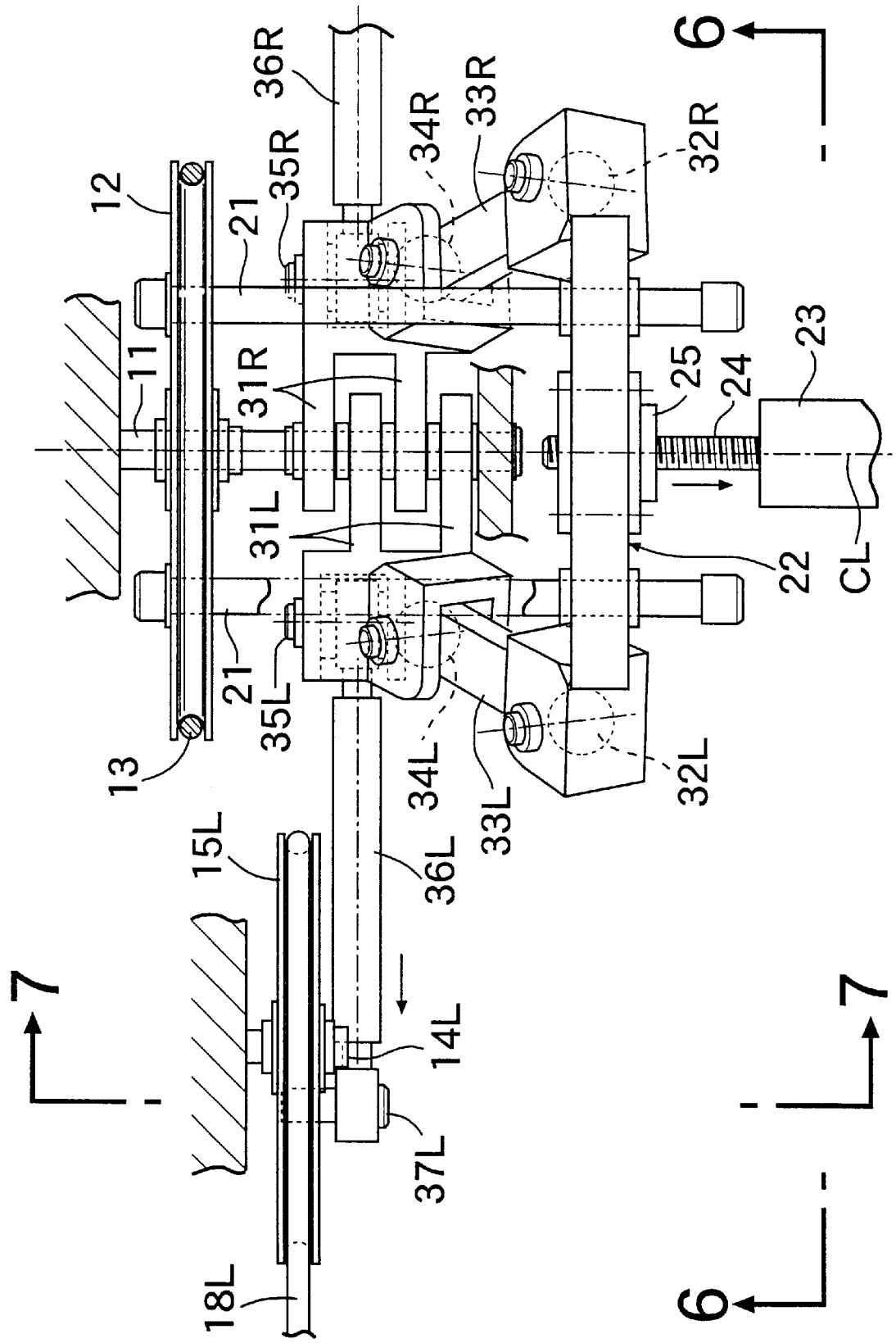
Figure 6:
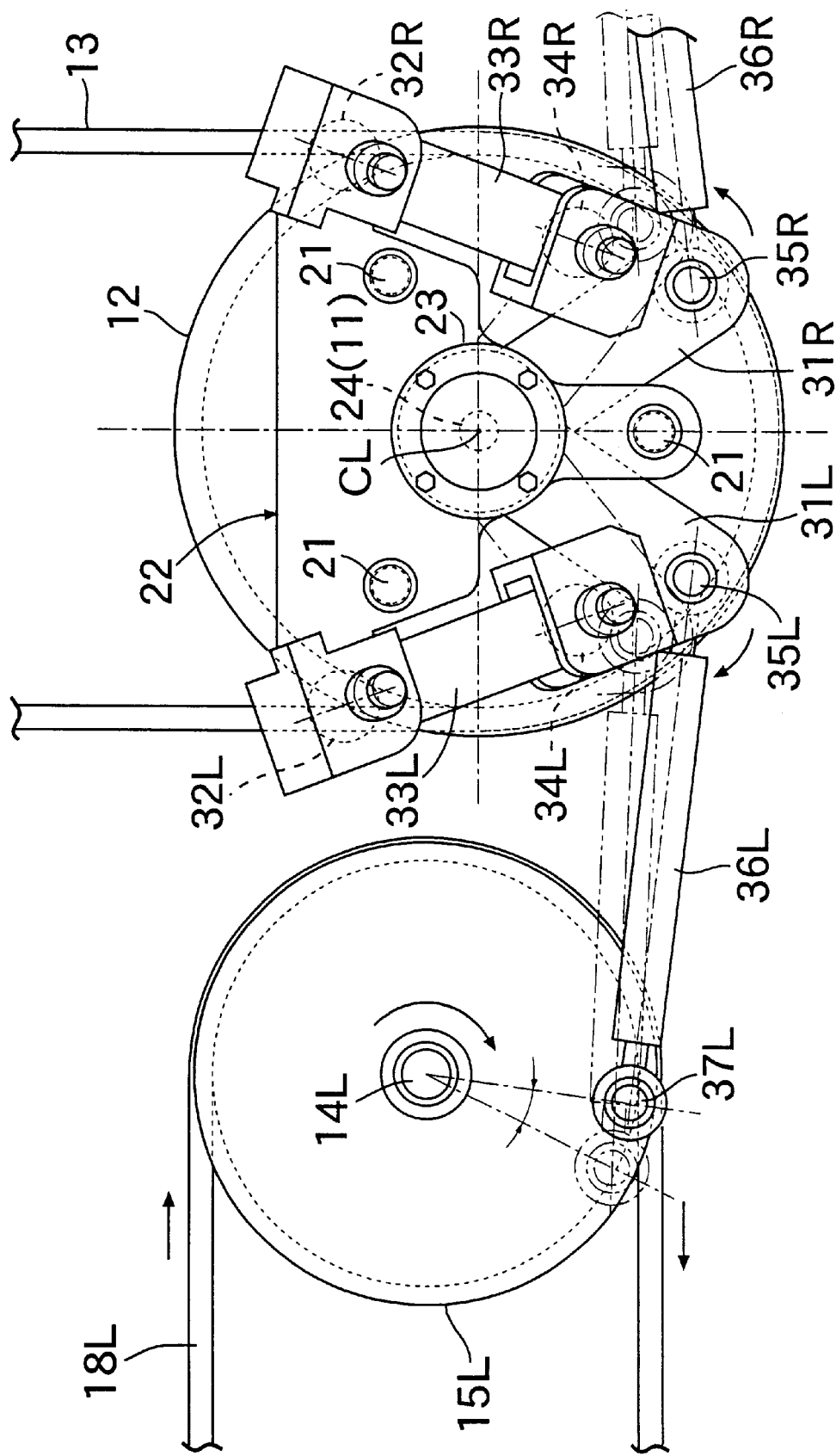

As shown in FIGS. 3 and 4, both the flaps FL and FR and the flaperons FEL and FER are in their lifted positions at a lowered angle of 0° during cruising of the airplane, and when the pilot is not operating the control wheel laterally, both the flaperons FEL and FER are at a steering angle of 0° and in neutral positions. Therefore, the first left and right links 31L and 31R, the second left and right links 33L and 33R, the third left and right links 36L and 36R, the left and right driving pulleys 15L and 15R and the left and right driven pulleys 17L and 17R are in positions laterally symmetric with respect to a vertical plane passing through the center line CL of the airframe.

Figure 10:
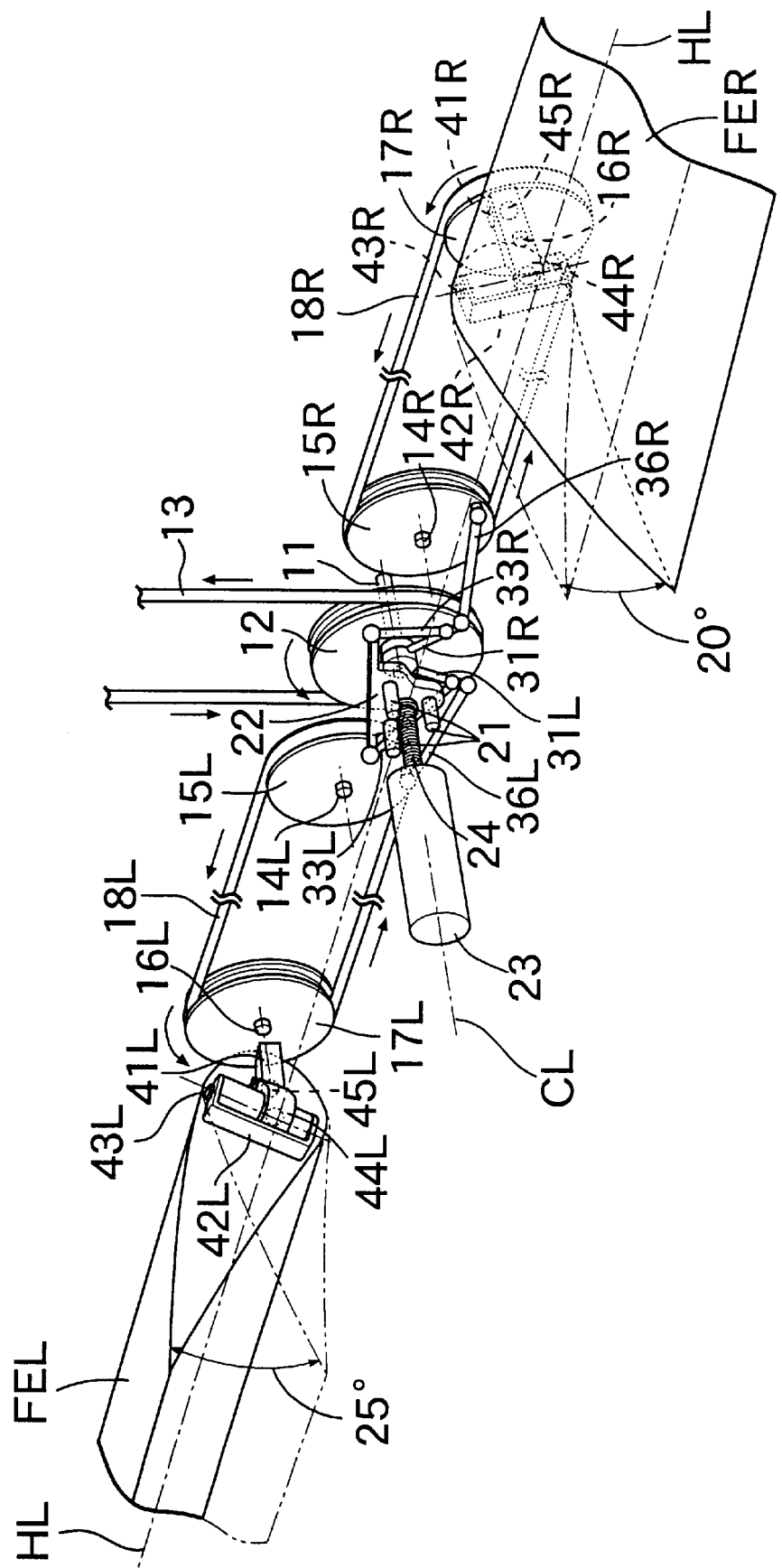

When the pilot operates the control wheel leftwards from such state, the center pulley 12 connected to the control wheel through the control cable 13 is rotated counterclockwise about the center shaft 11, and the slider 22 supported on the center pulley 12 through the three guide rods 21 is also rotated counterclockwise in unison with the center pulley 12, as shown in FIG. 10. Then, the second left link 33L pivotally supported at one end on the slider 22 through the ball joint 32L is pushed down, whereby the first left link 31L connected to the other end of the second left link 33L through the ball joint 34L is rotated counterclockwise about the center shaft 11, and the third left link 36L connected to the other end of the first left link 31L through the pin 35L is moved rightwards. With the rightward movement of the third left link 36L, the left driving pulley 15L supported on the pulley shaft 14L is rotated counterclockwise, and the left driven pulley 17L connected to the left driving pulley 15L through the control cable 18L is rotated counterclockwise about the pulley shaft 16L.

As a result, the arm 41L provided on the left driven pulley 17L pushes down the tip end of the flaperon link 44L through the ball joint 45L. At this time, the tip end of the flaperon link 44L is located in front of the hinge line HL of the left flaperon FEL. Therefore, the leading edge of the left flaperon FEL is lowered about the hinge line HL serving as a fulcrum point, and the trailing edge of the left flaperon FEL is lifted about the hinge line HL serving as the fulcrum point. The maximum upward steering angle of the left flaperon FEL at this time is set at 25°.

When the center pulley 12 and the slider 22 are rotated counterclockwise in unison with each other, the second right link 33R pivotally supported at one end thereof on the slide 22 through the ball joint 32R is pulled up, whereby the first right link 31R connected to the other end of the second right link 33R through the ball joint 34R is rotated counterclockwise about the center shaft 11, and the third right link 36R connected to the other end of the first right link 31R through the pin 35R is moved rightwards. With the rightward movement of the third right link 36R, the right driving pulley 15R supported on the pulley shaft 14R is rotated counterclockwise, and the right driven pulley 17R connected to the right driving pulley 15R through the control cable 18R is rotated counterclockwise about the pulley shaft 16R.

As a result, the arm 41R provided on the right driven pulley 17R pushes up the tip end of the flaperon link 44R through the ball joint 45R. At this time, the tip end of the flaperon link 44R is located in front of the hinge line HL of the right flaperon FER and hence, the leading edge of the right flaperon FER is lifted about the hinge line HL serving as a fulcrum point, and the trailing edge of the right flaperon FER is lowered about the hinge line HL serving as the fulcrum point. The maximum downward steering angle of the right flaperon FER at this time is set at 20°.

When the pilot operates the control wheel leftwards, as described above, the trailing edge of the left flaperon FEL is lifted from the neutral position to decrease the lifting power of the left main wing WL, and the trailing edge of the right flaperon FER is lowered from the neutral position to increase the lifting power of the right main wing WR. Therefore, a leftward rolling moment is generated by a difference between the lifting powers of the left and right main wings WL and WR.

The case where leftward rolling moment is generated by operating the control wheel leftwards has been described above. The operation in a case where a rightward rolling moment by operating the control wheel rightwards is substantially the same as the above-described case, except that the lateral direction is reversed.

When the left and right flaperons FEL and FER are steered in the vertically reverse directions through the same angle, the drag on the main wing WL, WR whose left or right flaperon FEL or FER has been lowered is increased, while the drag on the main wing WL, WR whose left or right flaperon FEL or FER has been lifted is decreased. For this reason, a yawing moment opposite from a turning direction is generated (an adverse yawing phenomenon), whereby a smooth turning is obstructed. Therefore, upward and downward steering angles of the flaperons FEL and FER are set so that the upward steering angle is larger than the downward steering angle when the flaperons FEL and FER function as ailerons, whereby the difference between drags on the left and right can be decreased to enable a smooth turning.

Figure 14A:
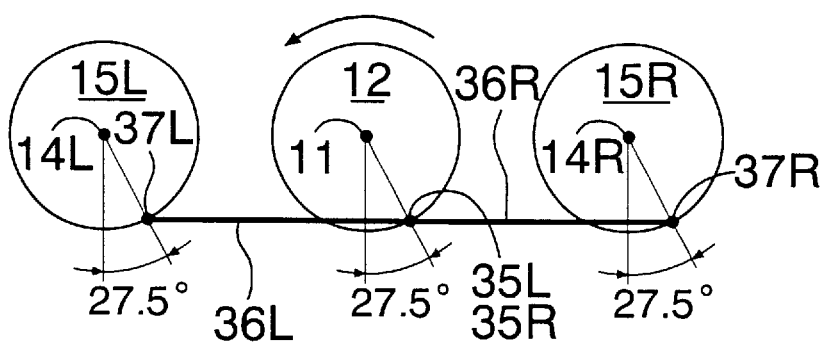
FIGS. 14A to 14D are diagrams for explaining a difference between steering angles of the left and right flaperons.

If the pins 35L and 35R connecting the second links 33L and 33R and the third links 36L and 36R are located right below the center shaft 11; the pins 37L and 37R of the left and right driving pulleys 15L and 15R are located right below the pulley shafts 14L and 14R; the diameters of the center pulley 12 and the left and right driving pulleys 15L and 15R are equal to each other; and the height of the center shaft 11 and the height of the left and right pulley shafts 14L and 14R are equal to each other, as shown in FIG. 14A, the angle of rotation of the center pulley 12 is equal to the angle of rotation of the left and right driving pulleys 15L and 15R and hence, when the left and right flaperons FEL and FER function as the ailerons, a difference between the steering angles thereof cannot be generated.

Figure 14B:
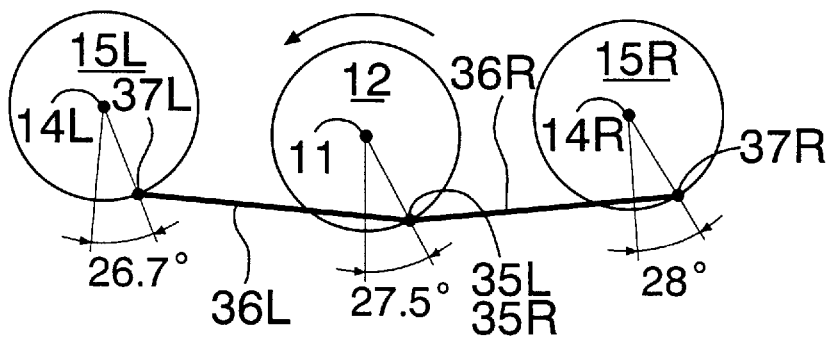
Figure 14C:
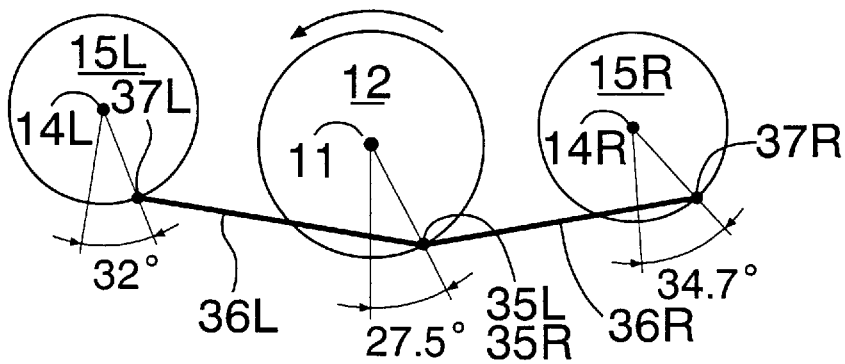

In contrast, if the height of the left and right pulley shafts 14L and 14R is different from the height of the center shaft 11, as shown in FIG. 14B, or if the diameter of the left and right driving pulleys 15L and 15R is different from the diameter of the center pulley 12, as shown in FIG. 14C, the angles of rotation of the left and right driving pulleys 15L and 15R can be different from each other, thereby operating the left and right flaperons FEL and FER in vertically opposite directions at different steering angles. However, a difference between steering angles of the left and right flaperons FEL and FER provided by such technique is slight and hence, it is difficult to sufficiently compensate for the adverse yawing phenomenon.

Figure 14D:
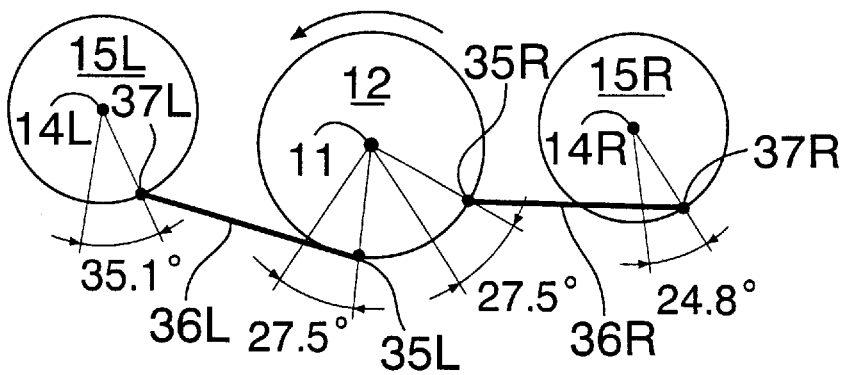

On the other hand, in the present embodiment shown in FIG. 14D, the pin 35L connecting the first left link 31L and the third left link 36L is located on the left of and below the center shaft 11, and the pin 35R connecting the first right link 31R and the third right link 36R is located on the right of and below the center shaft 11. Therefore, for example, when the center pulley 12 and the slider 22 are rotated counterclockwise about the center shaft 11, the amount of rightward movement of the pin 35L connecting the first left link 31L and the third left link 36L is increased, and the amount of rightward movement of the pin 35R connecting the first right link 31R and the third right link 36R is decreased. Therefore, the upward steering angle of the left flaperon FEL connected to the third left link 36L moved rightwards by a larger amount is increased, and the downward steering angle of the right flaperon FER connected to the third right link 36R moved rightwards by a smaller amount is decreased. Thus, it is possible to decrease the difference between the drags on the left and right main wings WL and WR to sufficiently compensate for the adverse yawing phenomenon.

If the height of the left and right pulley shafts 14L and 14R is larger than the height of the center shaft 11 and if the diameter of the left and right driving pulleys 15L and 15R is smaller than the diameter of the center pulley 12, it works in a direction to promote the adverse yawing phenomenon. However, if the positions of the pins 35L and 35R are displaced laterally below the center shaft, it eliminates the effect of promoting the adverse yawing phenomenon to provide a sufficient effect. Therefore, the upward steering angles of the flaperons FEL and FER can be sufficiently larger than the downward steering angles, thereby reliably compensating for the adverse yawing phenomenon to enhance the turning performance.

Figure 7:
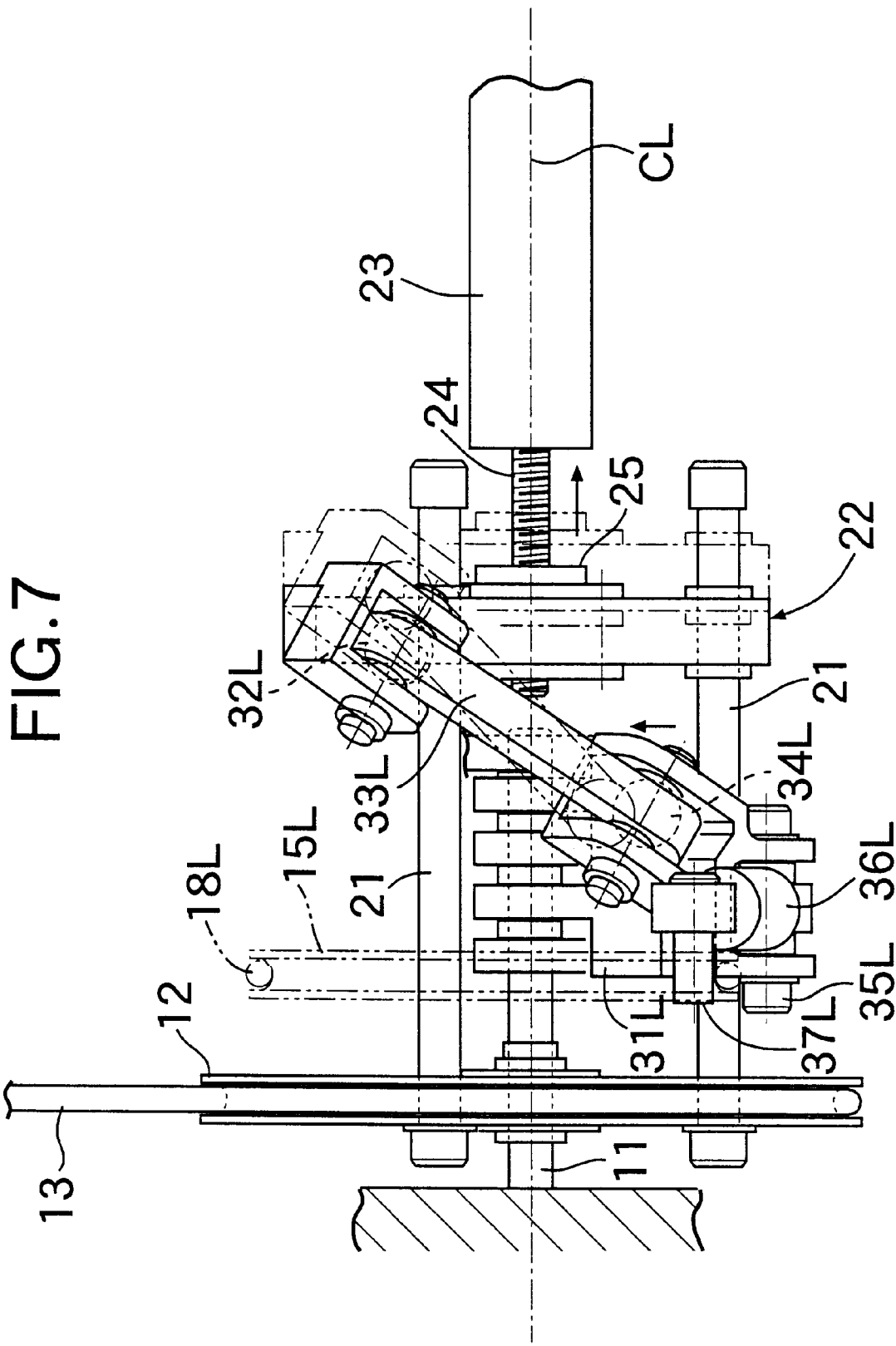
Figure 11:
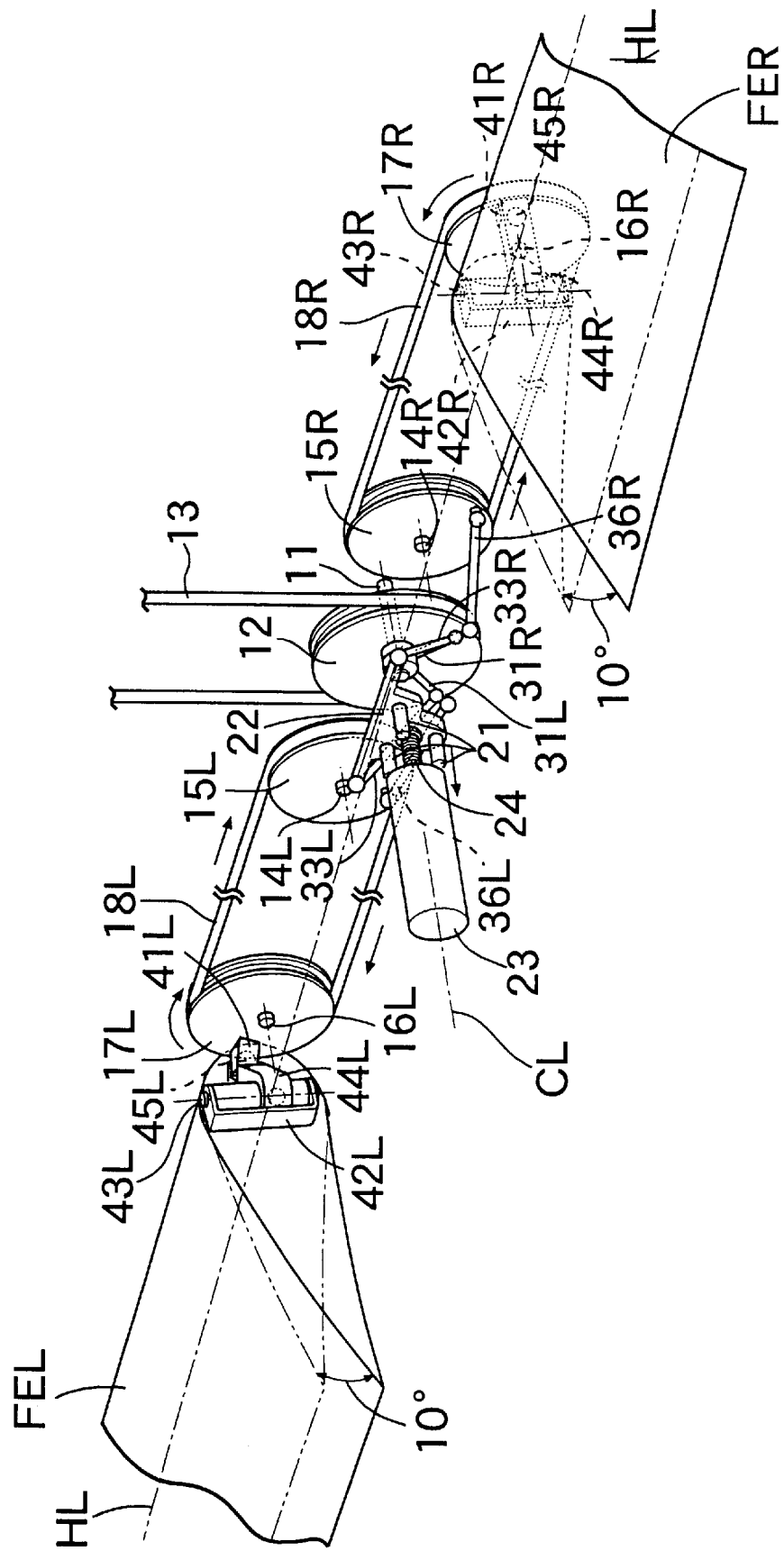
Figure 12:
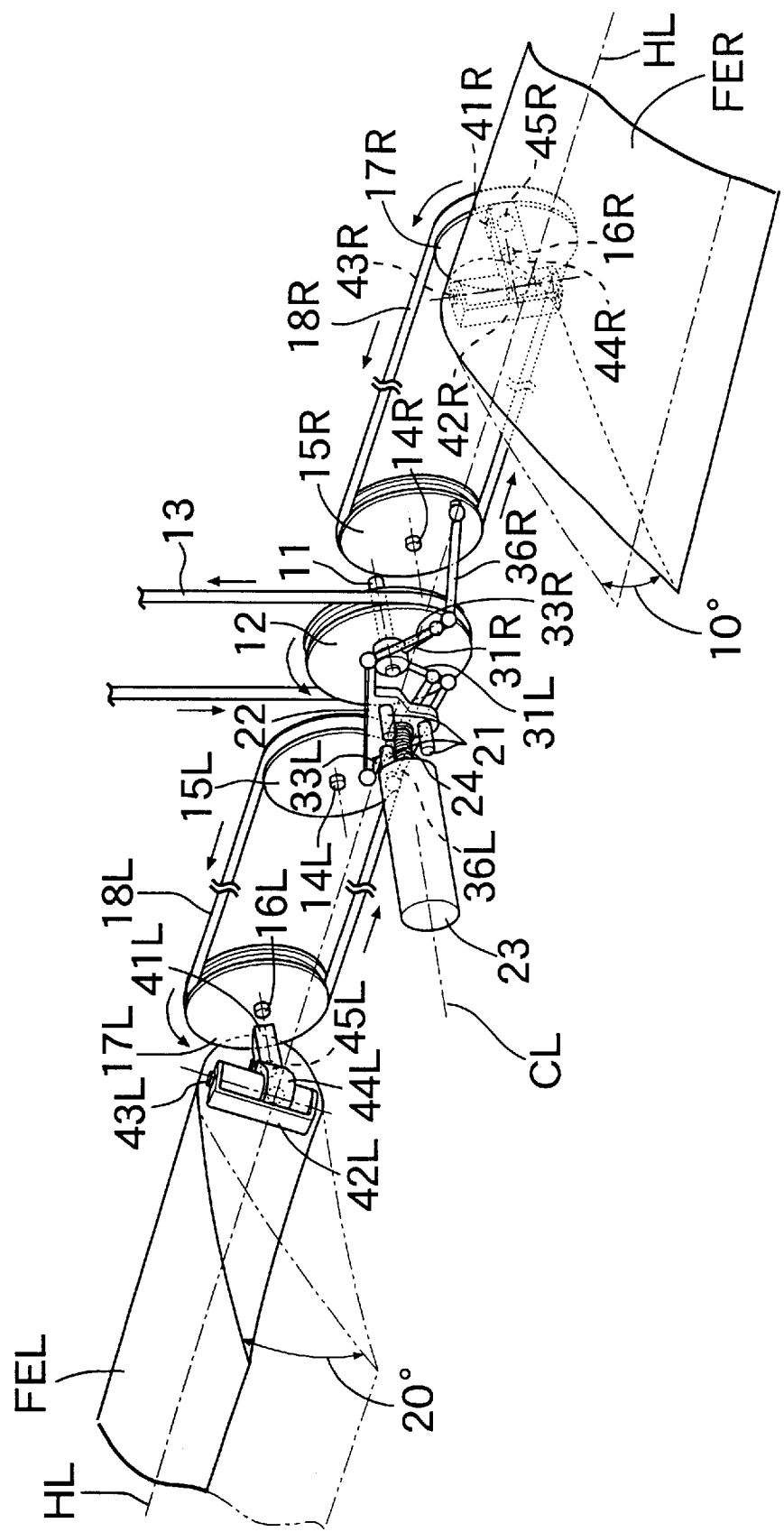

To lower the flaperons FEL and FER in the same phase in the taking-off or landing of the airplane to provide the flap functions, the actuator 23 is driven by the operation of the flap-operating lever by the pilot to pull the nut member 25 thread-engaged with the output shaft 24 comprising the externally threaded portion, thereby moving the slider 22 rearwards along the guide rods 21, as shown in FIGS. 7 and 11. As can be seen from FIG. 7, when the slider 22 is retreated, the positions of the ball joints 32L and 32R mounted at the laterally opposite ends of the slider 22 are also retreated and hence, the second left and right links 33L and 33R pivotally supported at their upper ends on the ball joints 32L and 32R are inclined from states shown by solid lines to states shown by dashed lines. This causes the ball joints 34L and 34R at the lower ends of the second left and right links 33L and 33R to be pulled up, whereby the first left and right links 31L and 31R are turned upwards about the center shaft 11.

As a result, the third left and right links 36L and 36R connected to the lower ends of the first left and right links 31L and 31R through the pins 35L and 35R are moved laterally outwards through an equal distance away from each other. Therefore, the left driving pulley 15L is rotated clockwise and the right driving pulley 15R is rotated counterclockwise by the same angle. Thus, the left and right driven pulleys 17L and 17R connected to the left and right driving pulley 15L and 15R through the control cables 18L and 18R are also rotated in opposite directions by the same angle, and the left and right flaperons FEL and FER are lowered 10°. The lowering angles of the flaperons FEL and FER can be set at any value. When the actuator 23 is driven in the opposite direction from the lowered states of the flaperons FEL and FER to advance the slider 22 to its original position, the left and right flaperons FEL and FER are lifted to the neutral positions.

When the pilot operates the control wheel, for example, leftwards in the lowered states of the flaperons FEL and FER in order to control the rolling of the airframe, the center pulley 12 and the slider 22 are rotated counterclockwise about the center shaft 11. Then, the second left link 33L connected to the slider 22 is pushed down, whereby the first left link 31L connected to the second left link 33L is rotated counterclockwise about the center shaft 11, and the third left link 36L connected to the first left link 31L is moved rightwards. With the rightward movement of the third left link 36L, the left driving pulley 15L supported on the pulley shaft 14L is rotated counterclockwise, whereby the left driven pulley 17L connected to the left driving pulley 15L through the control cable 18L is rotated counterclockwise about the pulley shaft 16L. As a result, the arm 41L provided on the left driven pulley 17L pushes down the tip end of the flaperon link 44L through the ball joint 45L. Therefore, the leading edge of the left flaperon FEL is lowered about the hinge line HL serving as the fulcrum point, and the trailing edge of the left flaperon FEL is lifted about the hinge line HL serving as the fulcrum point. The maximum upward steering angle of the left flaperon at this time is set at 20° on the basis of the lowered position (of 10° downwards) of the flaperon FEL.

When the center pulley 12 and the slider 22 are rotated counterclockwise about the center shaft 11, the second right link 33R connected to the slider 22 is pulled up, whereby the first right link 31R connected to the second right link 33R is rotated counterclockwise about the center shaft 11, and the third right link 36R connected to the first right link 31R is moved rightwards. With the rightward movement of the third right link 36R, the right driving pulley 15R supported on the pulley shaft 14R is rotated counterclockwise, and the right driven pulley 17R connected to the right driving pulley 15R through the control cable 18R is rotated counterclockwise about the pulley shaft 16R. As a result, the arm 41R provided on the right driven pulley 17R pushes up the tip end of the flaperon link 44R through the ball joint 45R. Therefore, the leading edge of the right flaperon FER is lifted about the hinge line HL serving as the fulcrum point, and the trailing edge of the right flaperon FER is lowered about the hinge line HL serving as the fulcrum point. The maximum downward steering angle of the right flaperon FER is set at 10° downwards on the basis of the lowered position (of 10° downwards) of the flaperon FEL.

As described above, even if the flaperons FEL and FER are in the lowered states, the left and right flaperons FEL and FER can be operated in the opposite directions on the basis of the lowered states. Therefore, it is possible to allow the flaperons FEL and FER to provide the aileron functions, while lowering both of the flaps FL and FR and the flaperons FEL and FER in the taking-off or landing of the airplane to ensure the maximum lifting power, thereby carrying out the control of the rolling of the airframe without hindrance. At this time, the operations of the control wheel and the operation of the actuator 23 do not interfere with each other and hence, there is not a possibility that the operation of the control wheel is obstructed by the actuator 23 or that the operation of the actuator 23 is transmitted to the control wheel.

The case where the control wheel is operated leftwards to generate the leftward rolling moment has been described above. The operation in a case where a rightward rolling moment by operating the control wheel rightwards is substantially the same as the above-described case, except that the lateral direction is reversed.

When the flaperons FEL and FER are in the lowered states shown in FIG. 11, the position of the pin 35L connecting the first left link 31L and the third left link 36L is displaced further leftwards with respect to the center line CL of the airframe, and the pin 35R connecting the first right link 31R and the third right link 36R is displaced further rightwards with respect to the center line of the airframe, as compared with the case where the flaperons FEL and FER are in the neutral positions shown in FIG. 3. When the positions of the pins 35L and 35R are displaced laterally outwards, as described above, the ratio of the angle of rotation of the left and right driving pulley 15L and 15R to the angle of rotation of the center pulley 12 is decreased and hence, the vertical steering angle on the basis of the lowered states of the flaperons FEL and FER is decreased.

More specifically, when the steering angle of the flaperons FEL and FER in the neutral position is defined to be 0°, the maximum upward steering angle provided by the aileron operation is 25°, and the maximum downward steering angle is 20°. However, when the steering angle of the flaperons FEL and FER in the lowered states is defined to be 0°, the maximum upward steering angle provided by the aileron operation is 20°, and the maximum downward steering angle is 10°. Namely, in the state of the flaperons FEL and FER in the neutral position, a total aileron-steering angle (a difference in angle between the left-flaperon and right-flaperon steering angles) is 25°+20°=45°, and in the lowered states of the flaperons, a total aileron-steering angle (a difference in angle between the left-flaperon and right-flaperon steering angles) is 20°+10°=30°. Therefore, when the aileron operation is carried out at the maximum steering angle in the lowered states of the flaperons FEL and FER, the maximum lowering angle of the flaperons FEL and FER has been conventional 10°+20°=30°, but can be suppressed to 10°+10°=20°. Thus, it is possible to reduce the force for steering the control wheel and to avoid the generation of a tip stall due to an excessive lowering angle of the flaperons FEL and FER.

The center pulley 12, the slider 22 and the actuator 23 are disposed in a line on the axis of the center shaft 11, so that each of the flaperons FEL and FER provides the aileron function only by rotating the center pulley 12 and the slider 22 about the axis of the center shaft 11, and provides the flap function only by reciprocally moving the slider 22 along the axis of the center shaft 11. Therefore, the device is a single flaperon unit which has an extremely simple structure and which is made at a low cost in a small size and a light weight and hence, it can be easily mounted on the airframe.

Figure 13:
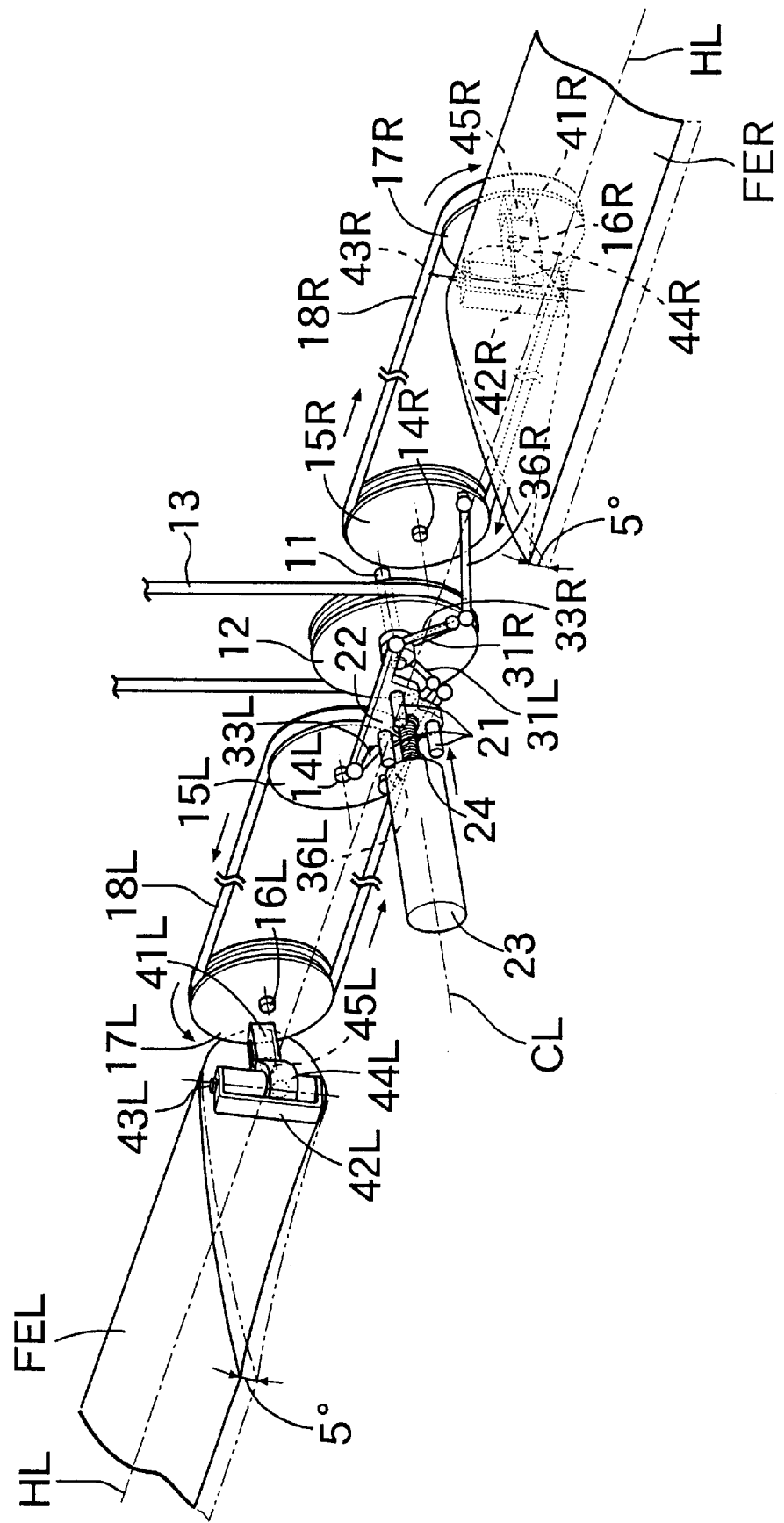

In addition, during cruising of the airplane, the left and right flaperons FEL and FER can be lifted or lowered at a very small angle (e.g., ±5° at the maximum) in the same phase to provide the drag-reducing function for the main wings WL and WR. To lower the left and right flaperons FEL and FER in the same phase, the slider 22 is merely moved rearwards along the guide rods 21 by driving the actuator 23 to pull the nut member 25, as described above with reference to FIG. 11. On the other hand, to lift the left and right flaperons FEL and FER in the same phase, the slider 22 is merely advanced along the guide rods 21 by driving the actuator 23 to push the nut member 25, as shown in FIG. 13.

In this case, however, the amount the actuator 23 is operated is small, as compared with the case described with reference to FIG. 11 where each of the flaperon provides the flap function, because the lowering angle and the lifting angle of the flaperons FEL and FER for reducing the drag on the main wings WL and WR are very small. To allow each of the flaperons to provide the flap function, the actuator 23 is driven based on the operation of the flap-operating lever by the pilot, but to allow each of the flaperons FEL and FER to provide the drag-reducing function, the actuator 23 is automatically driven by a control unit which will be described hereinafter.

The contents of a control for reducing the drag on the airplane by lifting or lowering the left and right flaperons FEL and FER at a very small steering angle in the same phase will be described below with reference to FIGS. 15 to 23.

Figure 15:
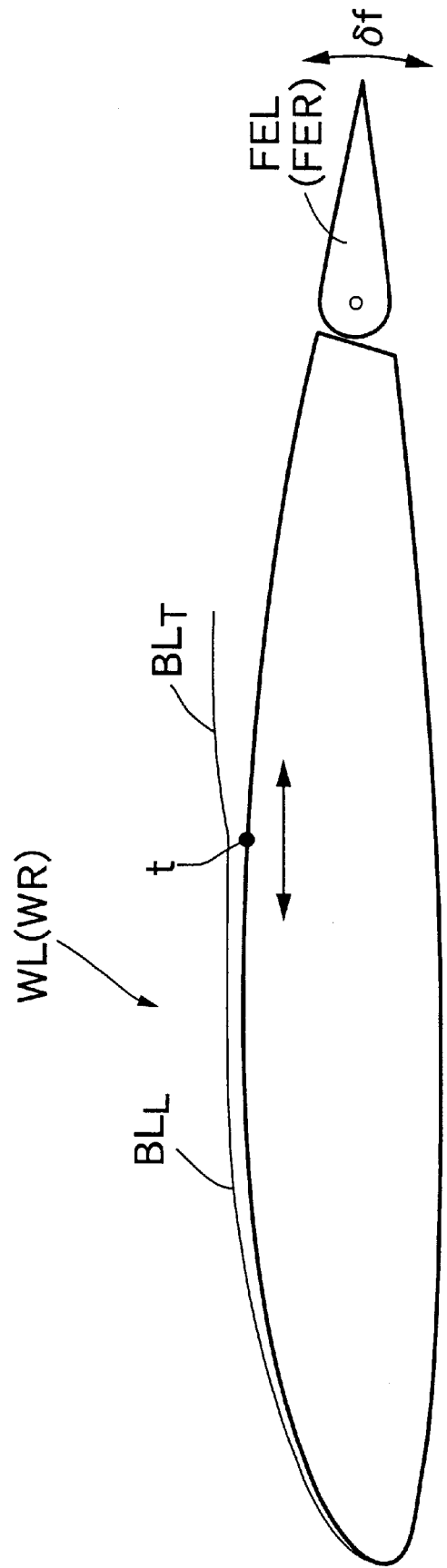

FIG. 15 shows a profile of the main wing WL, WR. The flaperons FEL and FER are mounted at the trailing edge of each of the main wings WL and WR so that the steering angle δf can be varied downwards and upwards. A boundary layer formed along the surface of the main wing WL, WR is comprised of a laminar flow boundary layer portion $BL_L$ on an upstream side, and a turbulent flow boundary layer portion $BL_T$ on a downstream side. The position of a transition point t between the laminar flow boundary layer portion $BL_L$ and the turbulent flow boundary layer portion $BL_T$ is displaced longitudinally by changing the steering angle δf of the flaperons FEL and FER. The friction drag in the laminar flow boundary layer portion $BL_L$ is remarkably small, as compared with a friction drag in the turbulent flow boundary layer portion $BL_T$ and hence, if the transition point t between the laminar flow boundary layer portion $BL_L$ and the turbulent flow boundary layer portion $BL_T$ is displaced toward the trailing edge as much as possible by controlling the steering angle δf of the flaperons FEL and FER, the area of the laminar flow boundary layer portion $BL_L$ can be enlarged to reduce the drag on the main wing WL, WR.

Figure 16:
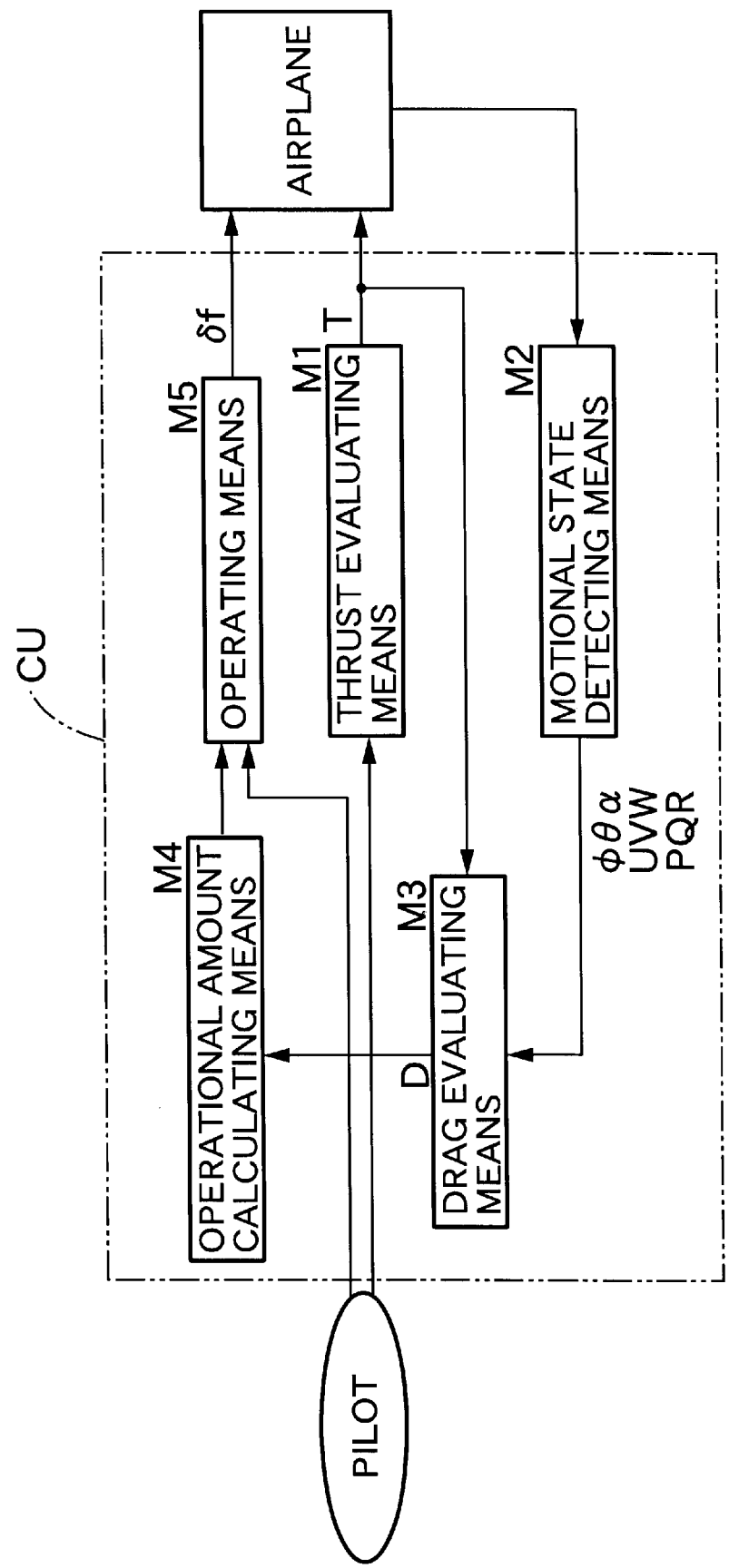

As shown in FIG. 16, a control unit CU for controlling the steering angle δf of the flaperons FEL and FER includes a thrust evaluating means M1 for evaluating the thrust T of the airplane, a motional-state detecting means M2 for detecting the motional state (speed, angular speed, attitude angle and angle of incidence) of the airplane, a drag evaluating means M3 for evaluating the drag D on the airplane based on the thrust T and the motional state of the airplane, an operational amount calculating means M4 for calculating the operational amount of the steering angle δf of the flaperons FEL and FER for minimizing the drag D, based on the variation in drag D generated by changing the steering angle δf of the flaperons FEL and FER, and an operating means M5 for operating the steering angle δf of the flaperons FEL and FER based on the operational amount.

The thrust T of the airplane is changed by the operation of a throttle lever provided by the pilot, and the thrust evaluating means M1 evaluates the magnitude of the thrust T based on the rotational speed of the engine and the like.

Variables representing the motional state of the airplane detected by the motional state detecting means M2 are φ: the rolling attitude angle (Euler angle about the X-axis)
θ: the pitch attitude angle (Euler angle about the Y-axis)
U: the speed in the direction of the X-axis
V: the speed in the direction of the Y-axis
W: the speed in the direction of the Z-axis
P: the rolling angular speed (angular speed about the X-axis)
Q: the pitch angular speed (angular speed about the Y-axis)

R: the yawing angular speed (angular speed about the Z-axis)

α: the pitch angle (an angle of incidence α) formed by the direction of movement of the airplane and the center line of the airplane.

The rolling attitude angle φ, the pitch attitude angle θ and the angle of incidence α can be detected by a vertical gyroscope or the like. The rolling angular speed P, the pitch angular speed Q and the yawing angular speed R can be detected by a rate gyroscope or the like. The speed U in the direction of the X-axis, the speed V in the direction of the Y-axis and the speed W in the direction of the Z-axis are capable of being detected by a pilot tube or the like.

The sequential order of the evaluation of the thrust T by the thrust evaluating means M1 and the detection of the motional state of the airplane by the motional state detecting means M2 can be selected as desired. Specifically, the motional state may be detected after evaluation of the thrust T; the thrust T may be evaluated after detection of the motional state; and the evaluation of the thrust T and the detection of the motional state may be carried out simultaneously.

The drag evaluating means M3 evaluates the drag D on the airplane based on the motional state represented by φ, θ, U, V, W, Z, P, Q, R and α detected by the motional state detecting means M2. A procedure for such evaluation will be described below.

Figure 17:
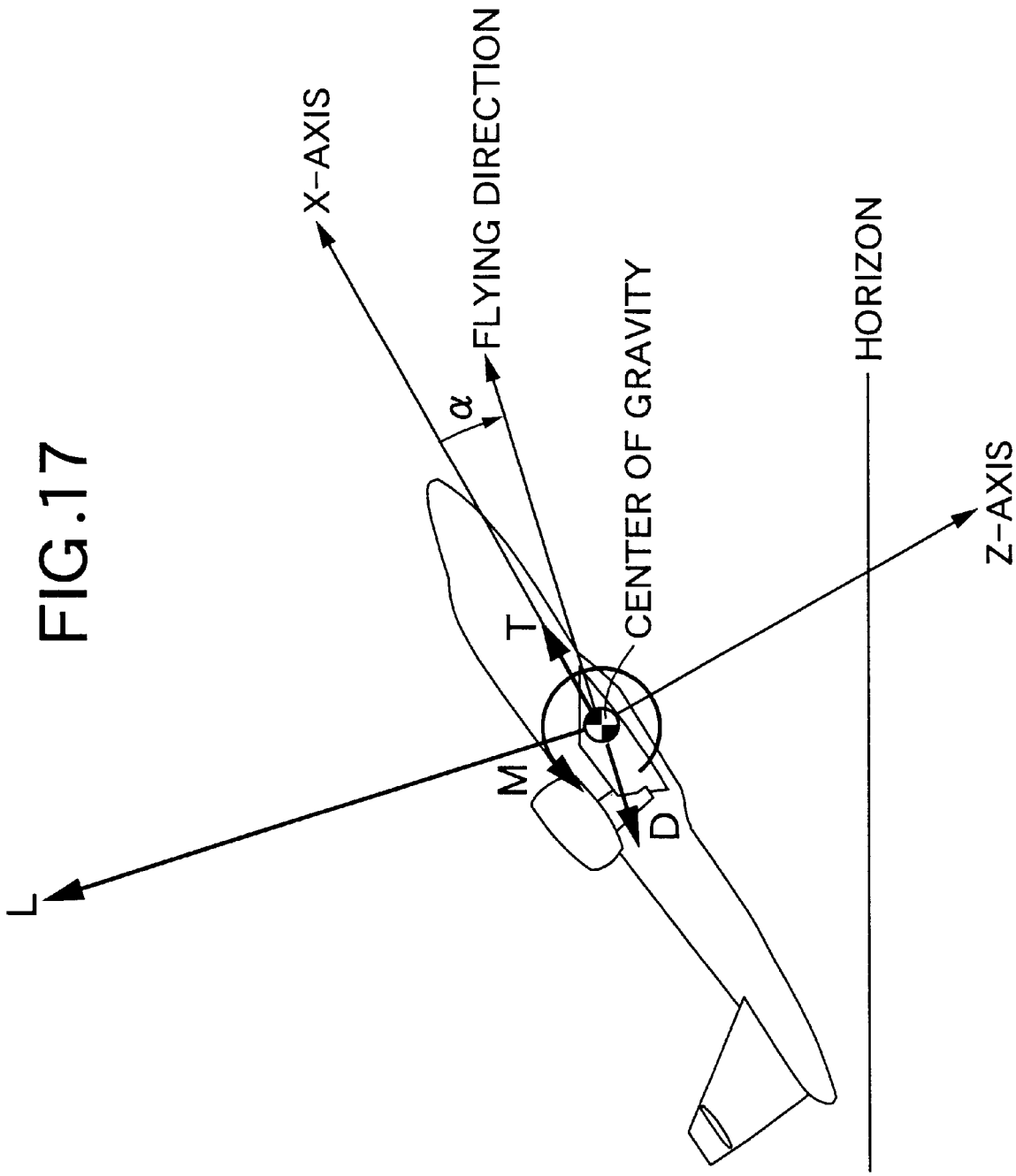

FIG. 17 shows the relationship among the lifting power L, the drag D and the angle of incidence a in a state in which the airframe is receiving a disturbance, using XYZ-axes of coordinates (stable axes with the X-axis matched with a direction of airframe speed vector during a steady balanced flying of the airplane) fixed to the airframe of the airplane. An air force Xa in a direction of the X-axis and an air force Za in a direction of the Z-axis are given according to the flowing equations (1) and (2), using the lifting power L, the drag D, the thrust T and the angle of incidence a in the balance of forces in the directions of the X-axis and the Z-axis.

$$Xa = T + L \cdot \sin\alpha - D \cdot \cos\alpha \quad (1)$$

$$Za = -L \cdot \cos\alpha - D \cdot \sin\alpha \quad (2)$$

If the lifting power L is eliminated from the above equations (1) and (2), the drag D is given according to the following equation (3):

$$D = (T - Xa) \cdot \cos\alpha - Za \cdot \sin\alpha \quad (3)$$

Equation (3) indicates that if the air force Xa in the direction of X-axis, the air force Za in the direction of the Z-axis, the thrust T and the angle of incidence α are known, the drag D can be calculated. The thrust T can be detected by the thrust evaluating means M1, and the angle of incidence a can be detected by the motional state detecting means M2. The remaining values, i.e., the air force Xa in the direction of X-axis and the air force Za in the direction of the Z-axis can be calculated in the following manner from the motional state detected by the motional state detecting means M2.

Figure 18:
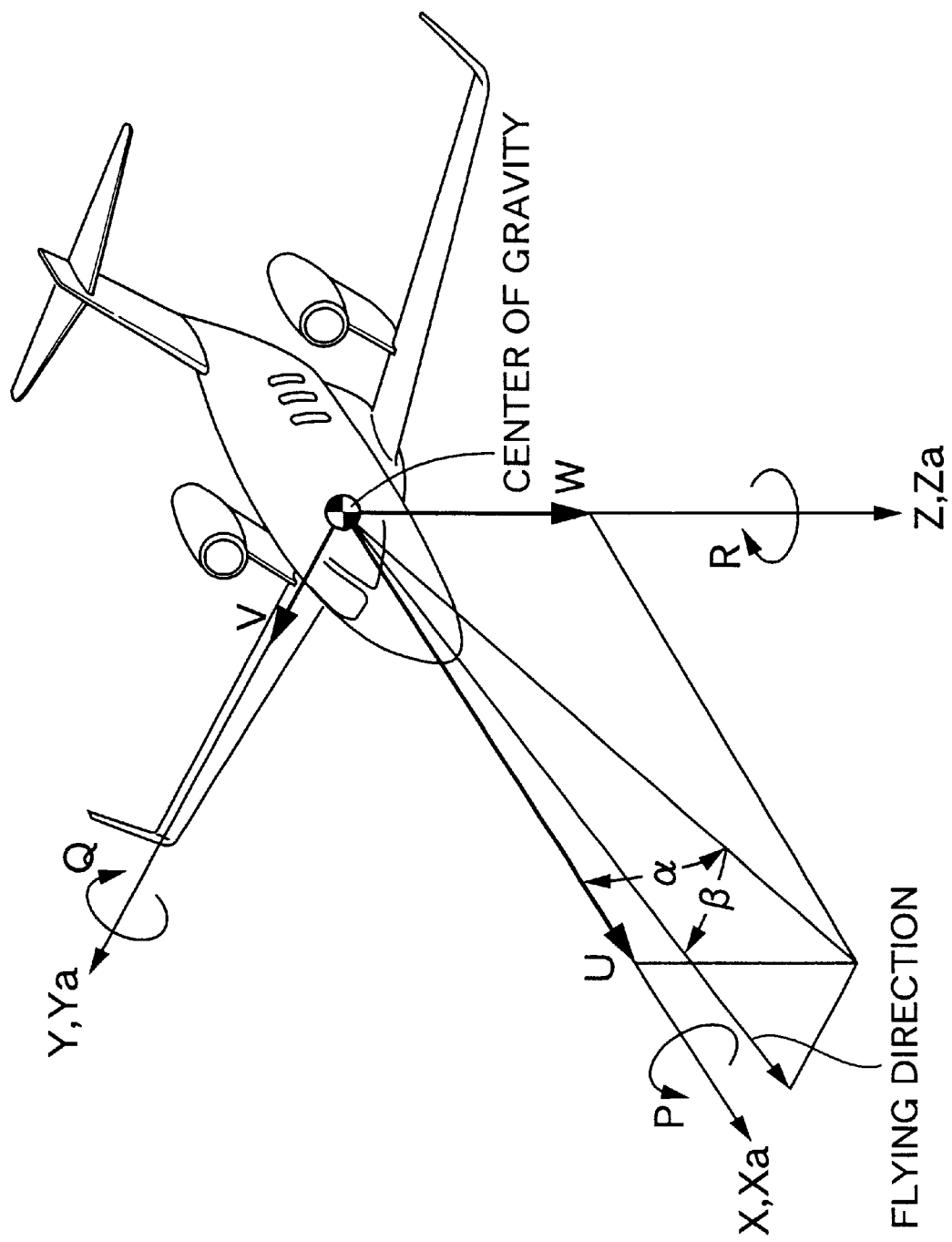

As well known, the motions of the airplane in the directions of the X-axis and the Z-axis are represented by the following equations (4) and (5) using the mass of the airframe represented by m and an acceleration of gravity represented by g (see FIG. 18). Here, the mass m of the airframe and the acceleration g of gravity are known, and a variation in mass m with consumption of a fuel can be calculated. Further, the motional state represented by φ, θ, U, V, W, Z, P, Q, R and α can be detected by the motional state detecting means M2.

$$m \cdot (dU/dt + Q \cdot W - R \cdot V) = -m \cdot g \cdot \sin\theta + Xa \quad (4)$$

$$m \cdot (dW/dt + P \cdot V - Q \cdot U) = m \cdot g \cdot \cos\theta \cdot \cos\phi + Za \quad (5)$$

Therefore, the air force Xa in the direction of the X-axis and the air force Za in the direction of the Z-axis are given according to the following equations (6) and (7), and if resulting values of the air forces are substituted for Xa and Za in the equation (3), the drag D on the airplane can be calculated.

$$Xa = m \cdot (dU/dt + Q \cdot W - R \cdot V) + m \cdot g \cdot \sin\theta \quad (7)$$

$$Za = m \cdot (dW/dt + P \cdot V - Q \cdot U) - m \cdot g \cdot \cos\theta \cdot \cos\phi \quad (8)$$

Then, an operational amount of the steering angle of the flaperons FEL and FER for minimizing the drag D on the airplane is calculated by the operational amount calculating means M4. A procedure for such calculation will be described below.

Figure 19:
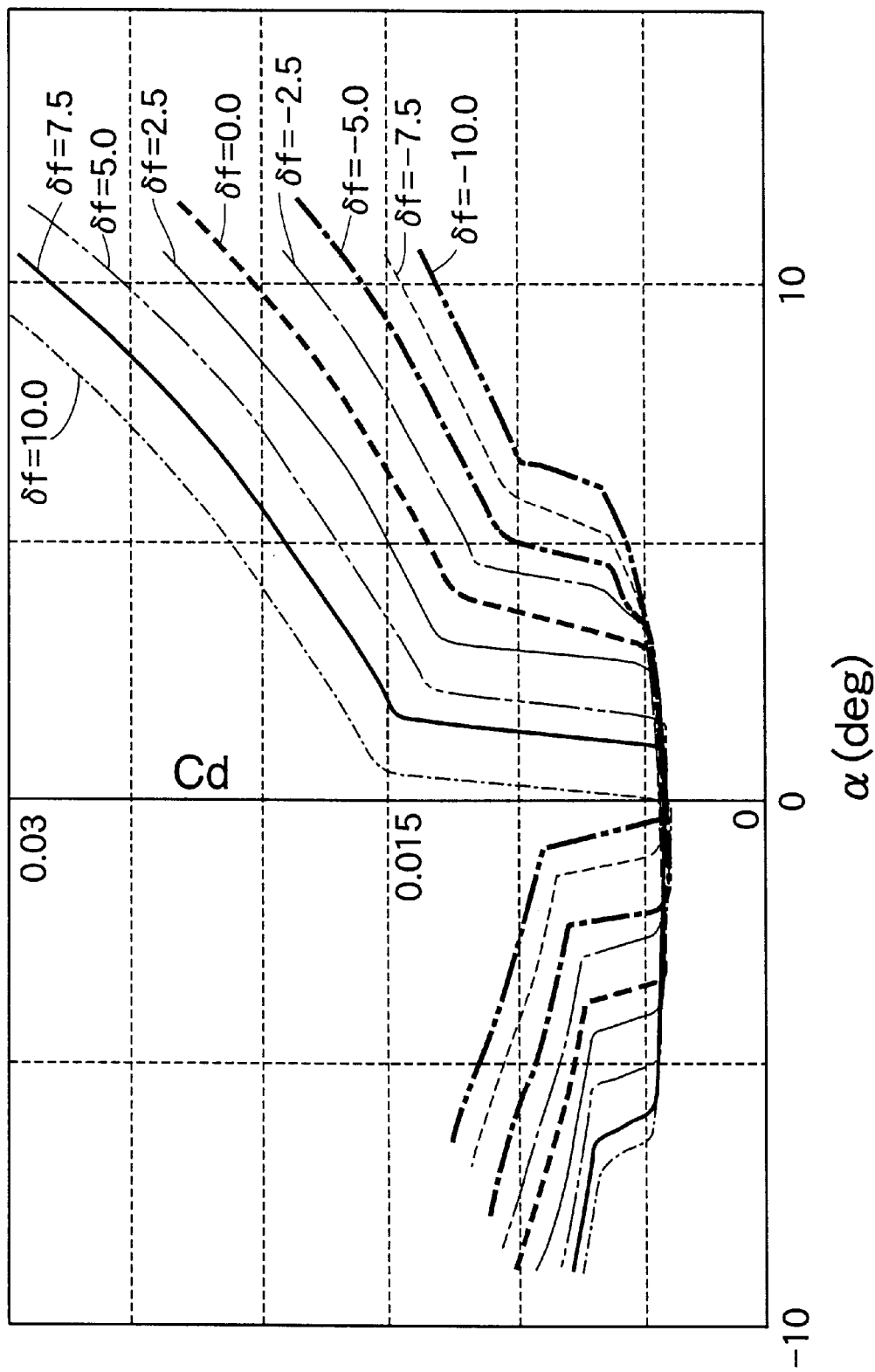

FIG. 19 shows a characteristic of the variation in the drag coefficient $C_D$ with respect to the angle of incidence a when the steering angle δf of the flaperons FEL and FER is varied. FIG. 19 shows that even if the angle of incidence α is any value, the drag coefficient $C_D$ is varied in accordance with the variation in steering angle δf of the flaperons FEL and FER. In other words, if the steering angle δf of the flaperons FEL and FER is changed, the drag coefficient $C_D$ can be changed.

Figure 20:
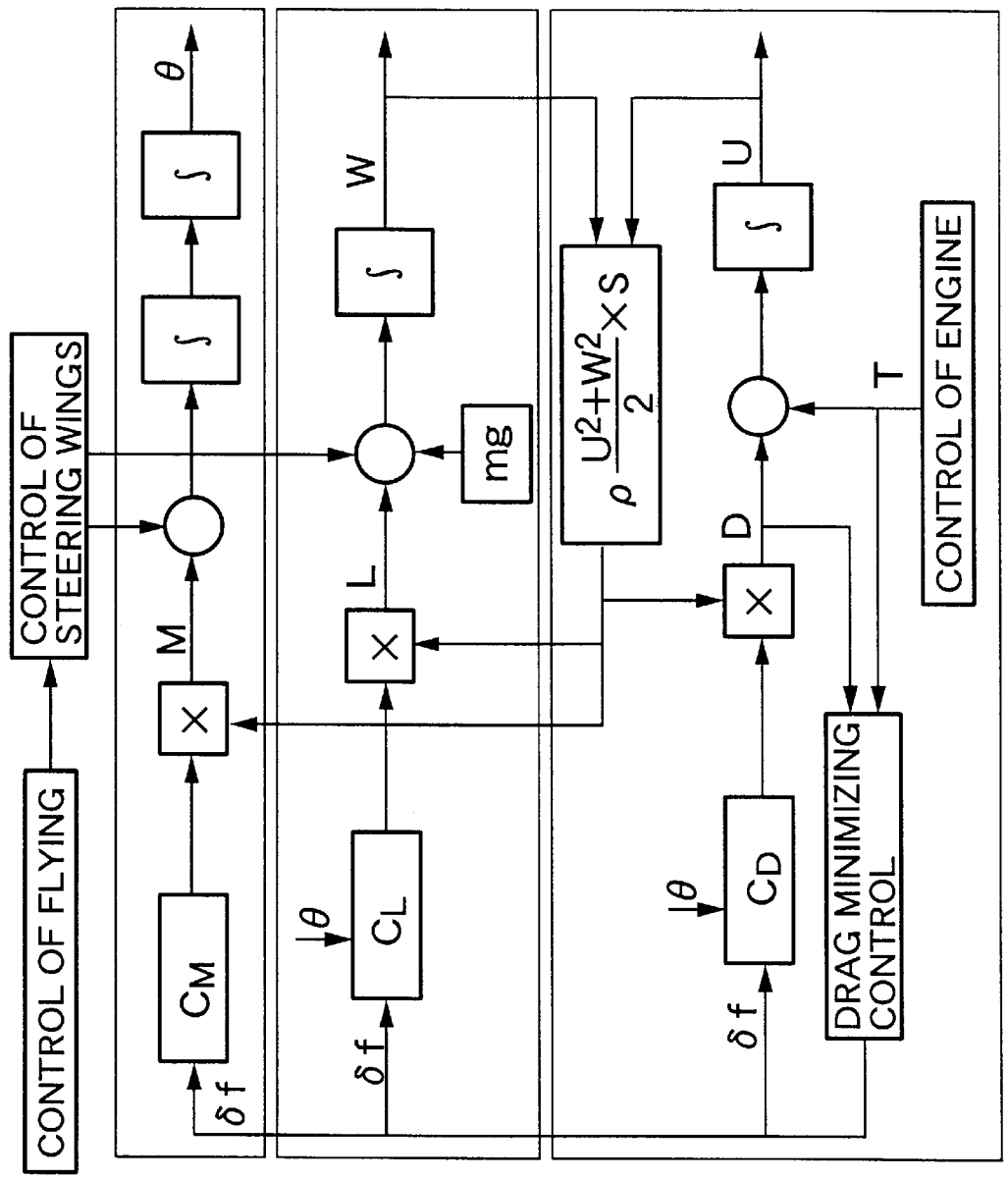

FIG. 20 shows a system for reducing the drag D on the airplane by changing the steering angle δf of the flaperons FEL and FER. If the steering angle δf of the flaperons FEL and FER is changed by the drag reducing control, the pitching moment coefficient $C_M$ is changed, and a pitching moment M calculated by multiplying this pitching moment coefficient $C_M$ by a product of a dynamic pressure σ $(U^2+W^2)/2$ and a wing area S is further changed by the control of a steering wing such as an elevator. The pitch attitude angle θ of the airplane is calculated by integrating the pitching moment M.

A lifting power coefficient $C_L$ is varied in accordance with a variation in steering angle δf of the flaperons FEL and FER and a variation in pitch attitude angle θ which are provided by the drag reducing control, and the lifting power L calculated by multiplying the lifting power coefficient $C_L$ by the product of the dynamic pressure σ $(U^2+W^2)/2$ and the wing area S is further changed by the control of the steering wing. The speed W in the direction of the Z-axis is calculated by integrating the value resulting from division of the lifting power L by the airframe weight mg.

The drag coefficient $C_D$ is varied in accordance with the variation in the steering angle δf of the flaperons FEL and FER and the variation in pitch attitude angle θ which are provided by the drag reducing control, and the drag D calculated by multiplying the drag coefficient $C_D$ by the product of the dynamic pressure σ $(U^2+W^2)/2$ and the wing area S is added to the thrust T changed by the control of the engine. By integrating the value resulting from such addition, the speed U in the direction of the X-axis is calculated.

The drag D calculated in such manner is repeatedly used along with the thrust in the drag reducing control, and the steering angle δf of the flaperons FEL and FER is renewed in order to minimize the drag D on the airplane.

Figure 21:
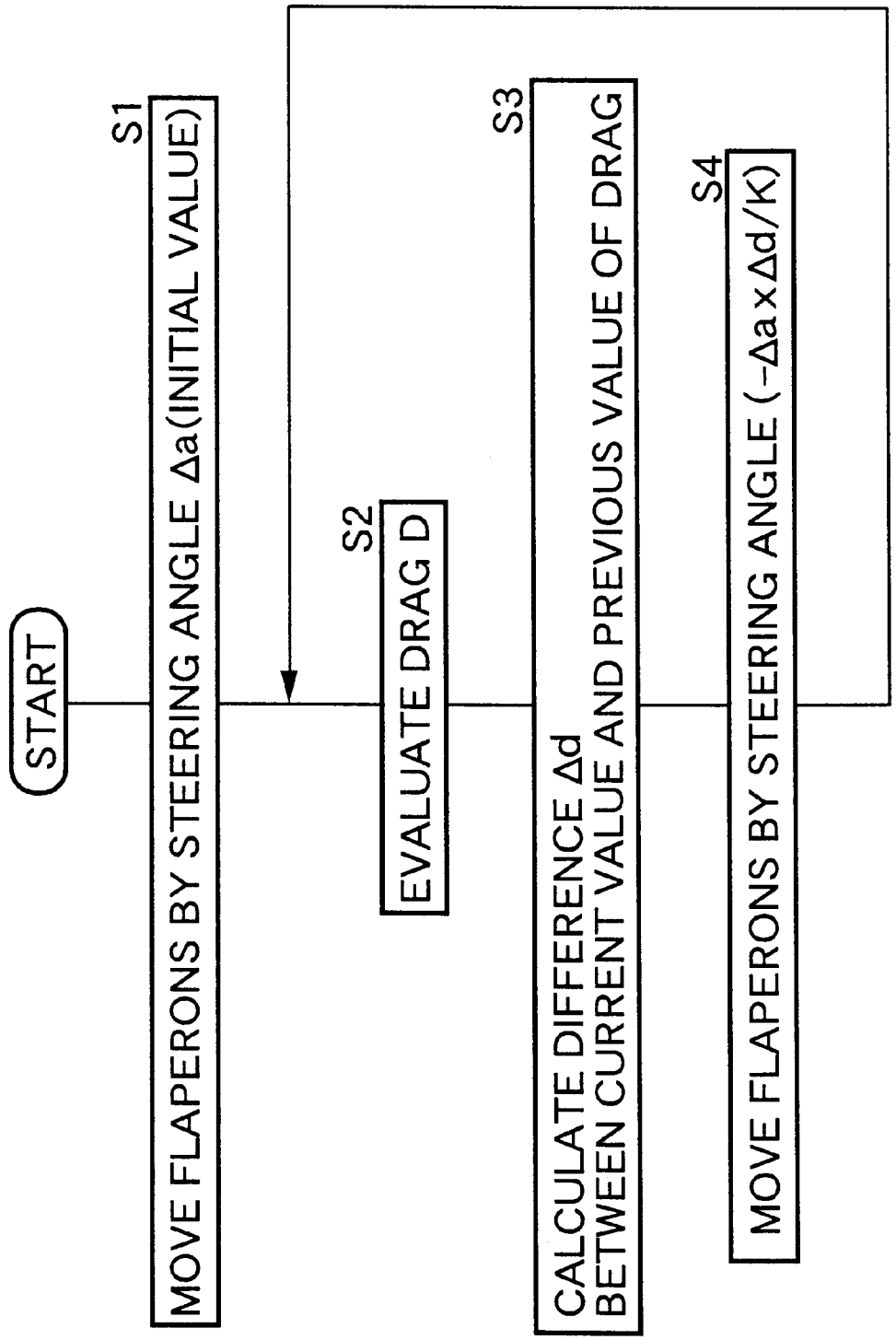
Figure 22:
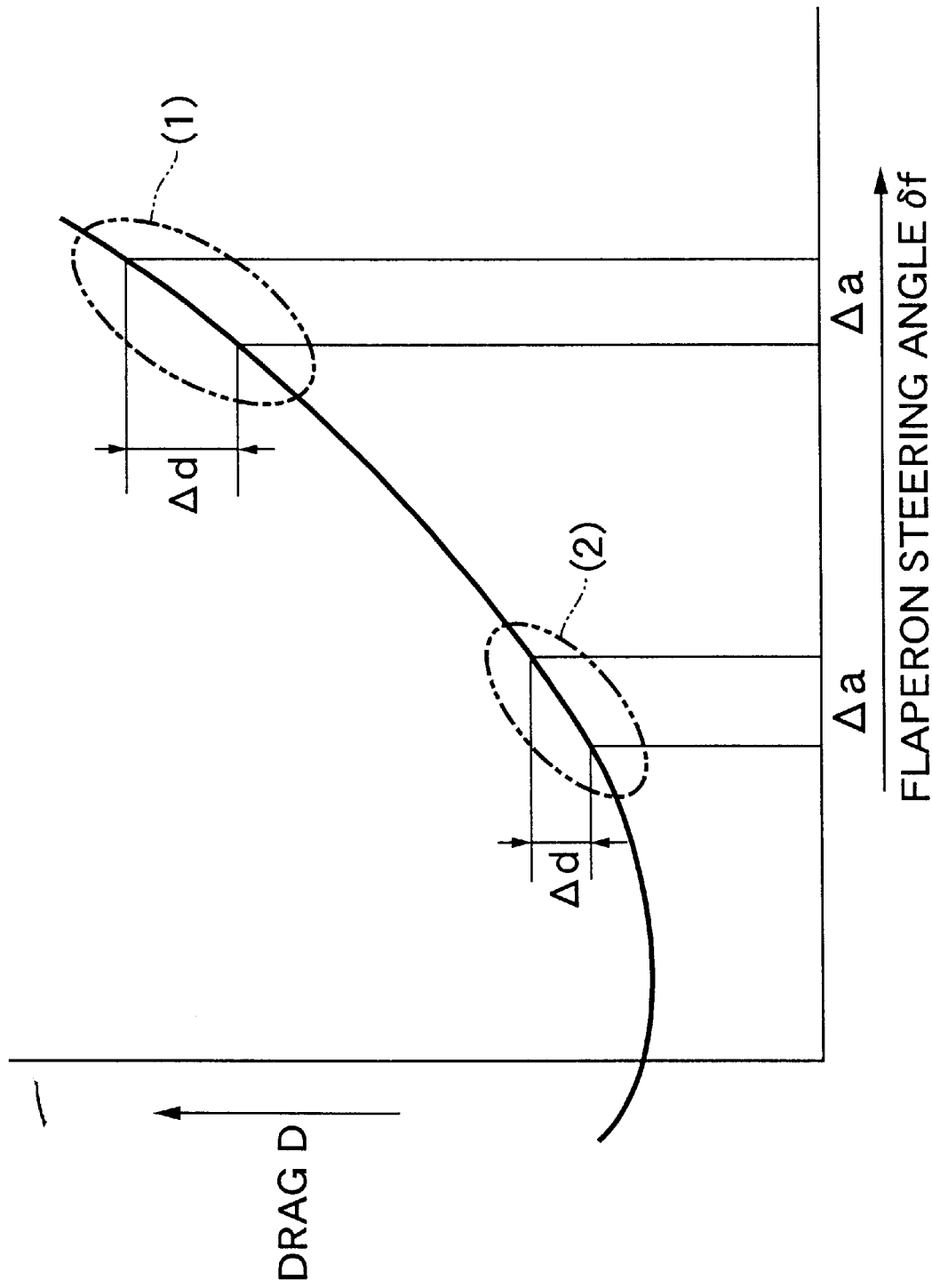

The contents of the drag reducing control will be described below with reference to the flowchart shown in FIG. 21.

First, at Step S1, the steering angle δf of the flaperons FEL and FER is increased by a previously determined initial value Δa, and at Step S2, the drag D is calculated according to equation (3). At subsequent Step S3, a difference Δd between the last value and the current value of the drag D is calculated. If the difference Δd is a positive value at Step S3 as a result of increasing of the steering angle δf by the initial value Δa at Step S1, namely, if the drag D is increased as a result of increasing of the steering angle δf, the steering angle δf is decreased. On the other hand, if the difference Δd is a negative value at Step S3, namely, if the drag D is decreased as a result of increasing of the steering angle of, the steering angle δf is further decreased at Step S4. Thus, the repetition of Steps S2 to S4 enables the steering angle δf of the flaperons FEL and FER to be converged into a value at which the drag D assumes a minimum value.

At Step S4, the operational amount of the steering angle δf of the flaperons FEL and FER is set at −Δa×(Δd/K) wherein K is a constant) rather than the initial value Δa. The reason is that the operational amount of the steering angle δf is increased in a region where the amount of variation in drag D with respect to the amount Δf of variation in steering angle is large, as shown by (1) in FIG. 22, and the operational amount of the steering angle δf is decreased in a region where the amount of variation in drag D with respect to the amount Δf of variation in steering angle is small, as shown by (2) in FIG. 22. Thus, it is possible to enhance the responsiveness and convergability of the control for converging the steering angle to a target value at which the drag D assumes the minimum value.

As described above, the steering angle δf of the flaperons FEL and FER can be converged to the target value at which the drag D assumes the minimum value by repeating the operation conducted by the operating means M5 for changing the steering angle δf of the flaperons FEL and FER by a very small angle, while monitoring the resulting increase or decrease in drag D to further change the steering angle δf by a very small angle. In addition, the drag reducing control is carried out while monitoring the actual drag D and hence, is not only extremely effective, but also can provide an effect, irrespective of motional state of the airplane. Moreover, the flaperons FEL and FER originally mounted on the main wings WL and WR of the airplane are utilized as the drag varying means and hence, a special drag varying means is not required, leading to a reduced weight and a reduced cost.

Figure 23A:
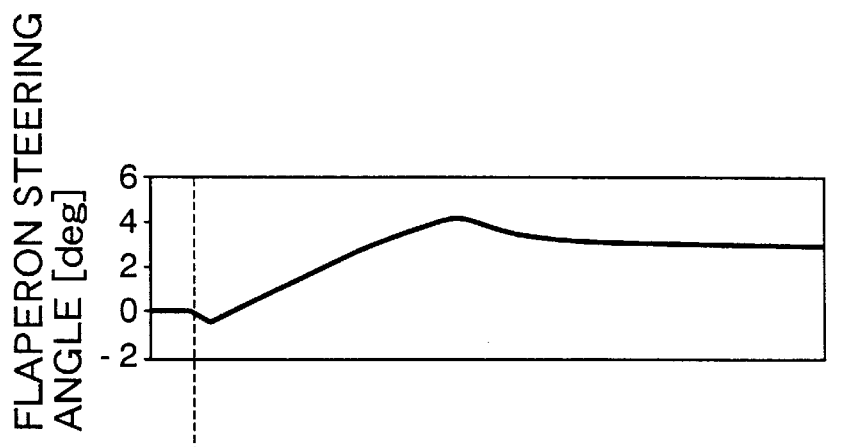
FIGS. 23A to 23C are graphs showing results of a simulation for the drag reducing control.
Figure 23B:
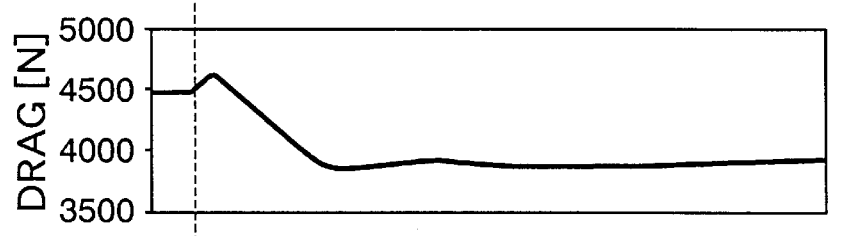
Figure 23C:
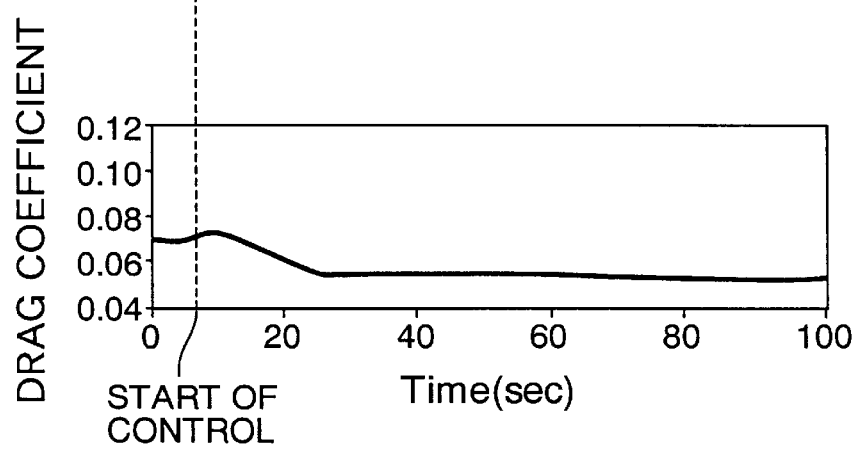

Results of the calculation in the drag reducing control simulation are shown in FIG. 23. It is confirmed from FIG. 23 that the drag D and the drag coefficient $C_D$ are decreased in accordance with a variation in steering angle δf of the flaperons FEL and FER.

When the steering angle δf of the flaperons FEL and FER is changed by the drag reducing control to decrease the drag D, there is a possibility that the pitching moment and the lifting power are also varied with the variation in steering angle δf, whereby the attitude and the motional state of the airplane are changed in an undesirable direction. For example, when the flaperons FEL and FER are operated in a lowering direction, a pitching moment in an airplane nose-lifting direction is generated, and the lifting powers on the main wings WL and WR are also increased. Therefore, the pitching moment in the airplane nose-lifting direction can be generated by trimming an elevator mounted on a horizontal empennage or a canard, thereby maintaining a balance about a pitch axis. An increase in drag produced with the operation of the elevator is negligible and hence, the drag on the entire airplane is reliably decreased.

The flaperons FEL and FER each providing the aileron function and the flap function have been illustrated as rotor blades in the embodiment, but the present invention is also applicable to an elevon providing an aileron function and an elevator function.

The center pulley 12 is operated by the control wheel in the embodiment, but may be operated by a control column, by an electric actuator or by a hydraulic actuator.

The actuator 23 for advancing the slider 22 may be a hydraulic cylinder, in place of being comprised of the electric motor, and the slider 22 may be manually moved forwards or rearwards.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed:

1. A flaperon operating device in an airplane having left and right main wings and left and right flaperons vertically movably mounted respectively on the trailing edges of said left and right main wings, wherein said left and right flaperons are moved vertically in reverse phases to control the rolling moment of the airplane, moved vertically in the same phase to control the lifting power or the pitching moment of the airplane, and moved vertically in the same phase by a small steering angle to control the drag of the airplane; said flaperon operating device comprising a rotor shaft extending in the longitudinal direction of the airplane, a rotor mounted for clockwise and counterclockwise rotation about said rotor shaft, a slider mounted for clockwise and counterclockwise rotation in unison with said rotor and for longitudinal movement along said rotor shaft, a first left link pivotally supported at one end thereof on said rotor shaft, a first right link pivotally supported at one end thereof on said rotor shaft, a second left link pivotally supported at one end thereof on said slider and at the other end thereof at an intermediate portion or the other end of said first left link, a second right link pivotally supported at one end thereof on said slider and at the other end thereof at an intermediate portion or the other end of said first right link, a third left link pivotally supported at the laterally inner end thereof at the other end of said first left link and operably coupled at the laterally outer end thereof to said left flaperon, and a third right link pivotally supported at the laterally inner end thereof at the other end of said first right link and operably coupled at the laterally outer end thereof to said right. flaperon, whereby said left and right flaperons are vertically moved in reverse phases by rotating said rotor and said slider clockwise or counterclockwise about said rotor shaft and moving said third left and right links laterally in the same direction through said second left and right links and said first left and right links, and said left and right flaperons are vertically moved in the same phase by moving said slider longitudinally along said rotor shaft and moving said first left and right links and said third left and right links in the laterally opposite directions through said second left and right links.

2. A flaperon operating device in an airplane according to claim 1, further including an actuator for operating said slider longitudinally along said rotor shaft, and a control means for calculating a steering angle for said left and right flaperons in order to minimize the drag on the main wings and for controlling the operation of said actuator based on said calculated steering angle.

3. A flaperon operating device in an airplane having left and right main wings and left and right flaperons vertically movably mounted respectively on the trailing edges of the left and right main wings, wherein said flaperons are moved vertically in reverse phases to function as ailerons, and said flaperons are moved vertically in the same phase to function as flaps; said flaperon operating device comprising a rotor shaft extending in the longitudinal direction of the airplane, a rotor mounted for clockwise and counterclockwise rotation about said rotor shaft, a slider mounted for clockwise and counterclockwise rotation in unison with said rotor and for longitudinal movement along said rotor shaft, a first left link pivotally supported at one end thereof on said rotor shaft, a first right link pivotally supported at one end thereof on said rotor shaft, a second left link pivotally supported at one end thereof on said slider and at the other end thereof at the other end of said first left link, a second right link pivotally supported at one end thereof on said slider and at the other end thereof at the other end of said first right link, a third left link pivotally supported at the laterally inner end thereof at the other end of said first left link and operably coupled at the laterally outer end thereof to said left flaperon, and a third right link pivotally supported at the laterally inner end thereof at the other end of said first right link and operably coupled at the laterally outer end thereof to said right flaperon, whereby said left and right flaperons are caused to function as ailerons in such a manner that they are vertically moved in reverse phases by rotating said rotor and said slider clockwise or counterclockwise about said rotor shaft and moving said third left and right links laterally in the same direction through said second left and right links and said first left and right links, and said left and right flaperons are caused to function as flaps in such a manner that they are vertically moved in the same phase by moving said slider longitudinally along said rotor shaft and moving said first left and right links and said third left and right links laterally in the opposite directions through said second left and right links.

4. A flaperon operating device in an airplane according to claim 3, including coupling mechanisms for operably coupling said third links and said flaperons, wherein each of said coupling mechanism comprises a driving pulley connected to the laterally outer end of each of said third link for rotation by the movement of said third link, a control cable, a driven pulley linked to said driving pulley through said control cable, and a flaperon link for converting the rotation of said driven pulley into the vertical movement of the flaperon.

5. A flaperon operating device in an airplane according to claim 3, wherein the aileron-steering angle at the time when said flaperon is in a flap-lowered state is set at a value smaller than the aileron-steering angle at the time when said flaperon is in a flap-lifted state.

* * * * *